United States Patent
Xie et al.

(10) Patent No.: US 12,069,599 B2
(45) Date of Patent: Aug. 20, 2024

(54) MEASUREMENT METHOD USING SYNCHRONIZATION SIGNAL BLOCK, TERMINAL DEVICE, AND BASE STATION

(71) Applicant: Huawei Technologies Co., Ltd., Shenzhen (CN)

(72) Inventors: Zonghui Xie, Shenzhen (CN); Lei Chen, Beijing (CN); Bin Xu, Beijing (CN); Hong Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 27 days.

(21) Appl. No.: 17/737,233

(22) Filed: May 5, 2022

(65) Prior Publication Data
US 2022/0369249 A1 Nov. 17, 2022

Related U.S. Application Data

(63) Continuation of application No. PCT/CN2019/116057, filed on Nov. 6, 2019.

(51) Int. Cl.
*H04W 56/00* (2009.01)
*G01S 5/00* (2006.01)
*H04W 84/06* (2009.01)

(52) U.S. Cl.
CPC ......... *H04W 56/001* (2013.01); *G01S 5/0036* (2013.01); *H04W 56/006* (2013.01); *H04W 84/06* (2013.01)

(58) Field of Classification Search
CPC ... H04W 24/10; H04W 72/044; H04W 48/12; H04W 56/0015; H04L 5/0078; G01S 5/0036
See application file for complete search history.

(56) References Cited

U.S. PATENT DOCUMENTS

| | | | |
|---|---|---|---|
| 2018/0262313 A1* | 9/2018 | Nam | H04L 5/0044 |
| 2018/0324678 A1* | 11/2018 | Chen | H04W 8/08 |
| 2019/0239106 A1* | 8/2019 | Cui | H04W 24/08 |
| 2019/0306734 A1* | 10/2019 | Huang | H04W 24/08 |

(Continued)

FOREIGN PATENT DOCUMENTS

| | | |
|---|---|---|
| CN | 109600770 A | 4/2019 |
| CN | 110121210 A | 8/2019 |

(Continued)

OTHER PUBLICATIONS

"Measurement Issues for NTN System," Source: CATT, Agenda Item: 6.6.4.1, Document for: Discussion and Decision, 3GPP TSG-RAN WG2 Meeting #107bis, R2-1912157, Chongqing, China, Oct. 14-18, 2019, 9 pages.

"Report of Email Discussion [107#62][NR/NTN] TP Mobility," Agenda Item: 6.6.4.1, Source: InterDigital Inc. (Email discussion rapporteur), Document for: Discussion, Decision, 3GPP RAN WG2 Meeting #107bis, R2-1913604, Chongqing, China, Oct. 14-18, 2019, 29 pages.

(Continued)

*Primary Examiner* — Yee F Lam
(74) *Attorney, Agent, or Firm* — SLATER MATSIL, LLP

(57) ABSTRACT

A measurement method including determining, by a terminal device, a first adjustment parameter of a to-be-measured neighboring cell, determining, based on the first adjustment parameter, a first synchronization signal block-based measurement timing configuration (SMTC) window corresponding to the to-be-measured neighboring cell, and measuring the to-be-measured neighboring cell based on the first SMTC window.

18 Claims, 12 Drawing Sheets

(56) References Cited

U.S. PATENT DOCUMENTS

| | | | | |
|---|---|---|---|---|
| 2019/0313272 | A1* | 10/2019 | Zhou | H04W 24/10 |
| 2019/0319748 | A1* | 10/2019 | Nam | H04W 72/563 |
| 2020/0022011 | A1* | 1/2020 | Lee | H04W 24/10 |
| 2020/0029315 | A1* | 1/2020 | Lin | H04L 1/0075 |
| 2020/0162939 | A1* | 5/2020 | Kim | H04B 7/0617 |
| 2020/0169340 | A1* | 5/2020 | Hwang | H04B 17/327 |
| 2020/0358547 | A1* | 11/2020 | Liu | H04J 11/0069 |
| 2020/0374735 | A1* | 11/2020 | Wei | H04L 5/0091 |
| 2023/0146103 | A1* | 5/2023 | Cheng | H04L 5/0094 |
| | | | | 370/252 |

FOREIGN PATENT DOCUMENTS

| | | | |
|---|---|---|---|
| WO | 2018203716 | A1 | 11/2018 |
| WO | 2019157661 | A1 | 8/2019 |

OTHER PUBLICATIONS

"InterDigital Inc. (Email discussion rapporteur)," Agenda Item: 6.6.4.1, Source: InterDigital Inc. (Email discussion rapporteur), Document for: Discussion, Decision, 3GPP RAN WG2 Meeting #107bis, R2-1913604, Chongqing, China, Oct. 14-Oct. 18, 2019, 29 pages.

"Measurement Issues for NTN System," Source: CATT, Agenda Item: 6.6.4.1, Document for: Discussion and Decision, 3GPP TSG-RAN WG2 Meeting #107bis, R2-1912157, Chongqing, P.R. China, Oct. 14-18, 2019, 9 pages.

"TP on NTN Mobility Issues and Solutions," Agenda Item: 6.6.4.1. Source: InterDigital, R2-1913605, Chongqing, China, Revision of R2-1910962, Oct. 14-Oct. 18, 2019, 9 pages.

\* cited by examiner

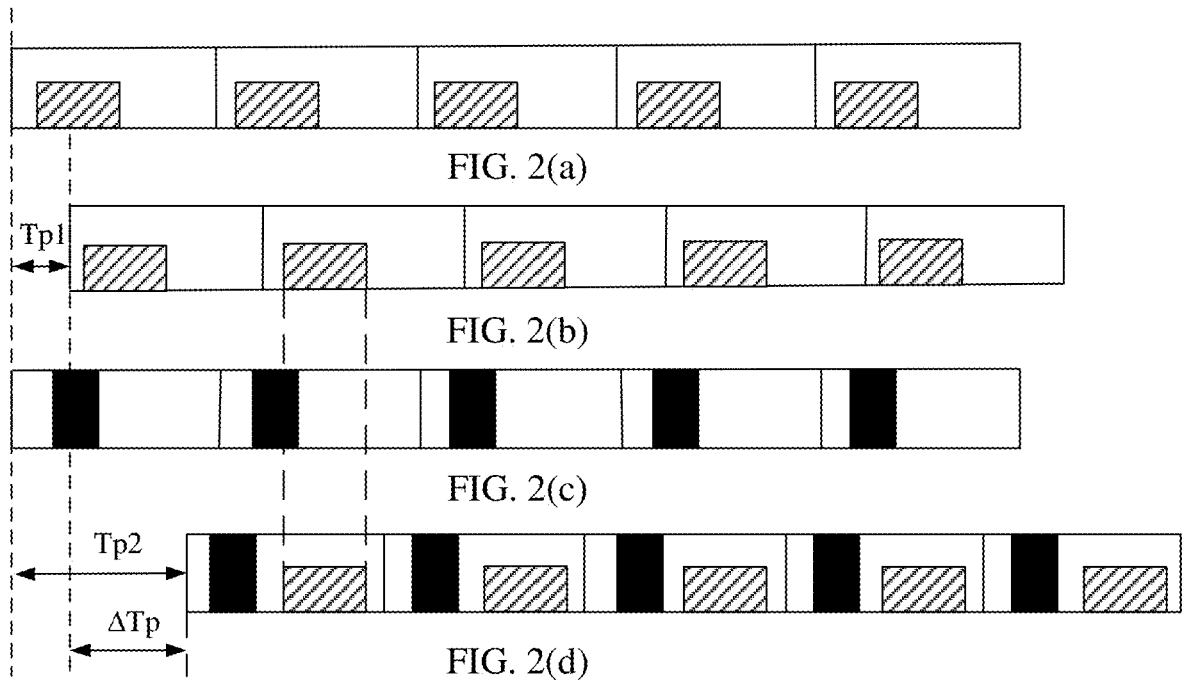
FIG. 2(a)
FIG. 2(b)
FIG. 2(c)
FIG. 2(d)
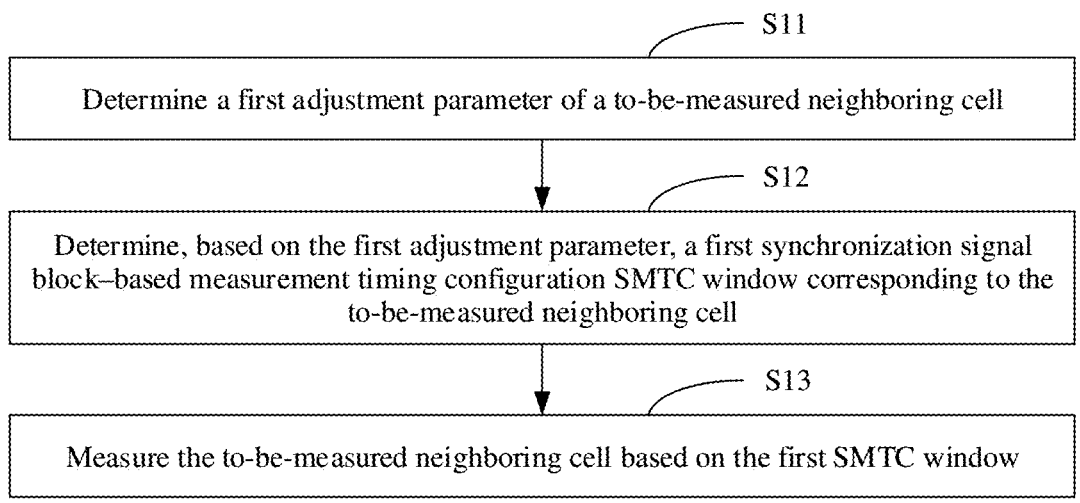
FIG. 3

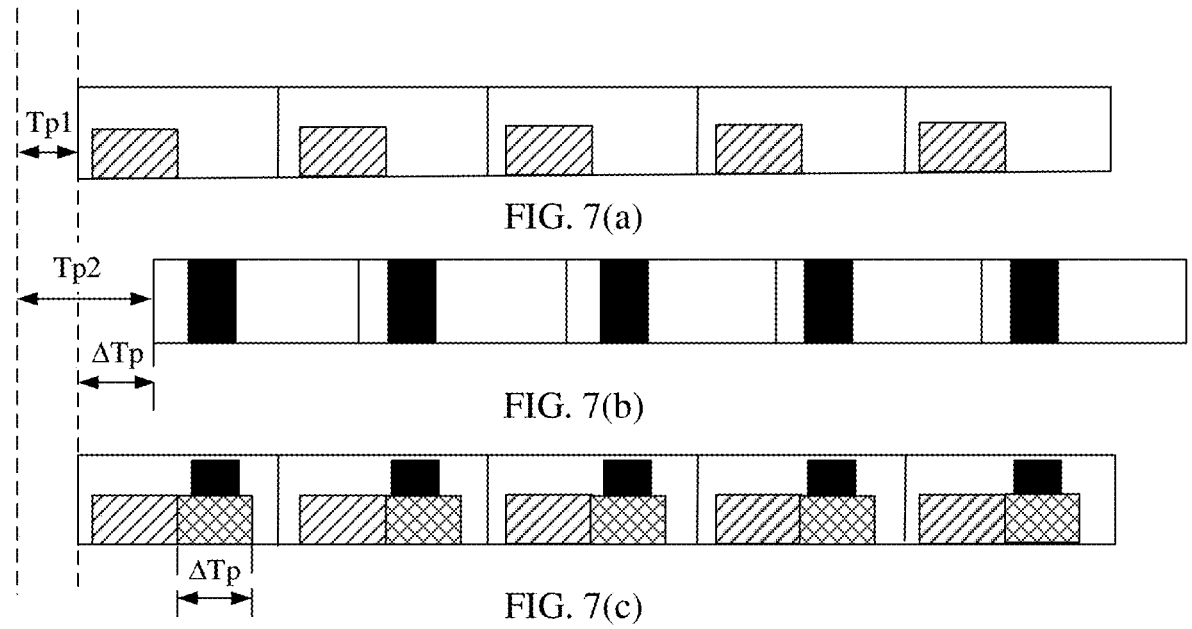
FIG. 7(a)
FIG. 7(b)
FIG. 7(c)
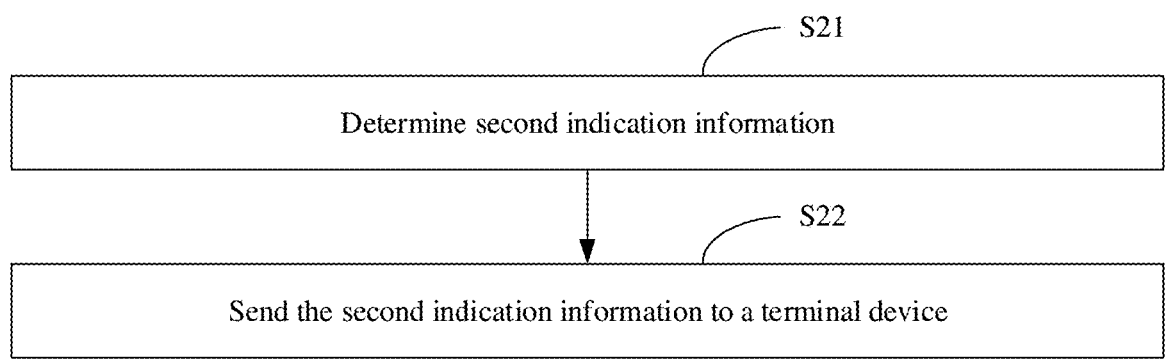
FIG. 8

MEASUREMENT METHOD USING SYNCHRONIZATION SIGNAL BLOCK, TERMINAL DEVICE, AND BASE STATION

CROSS-REFERENCE TO RELATED APPLICATIONS

This application is a continuation of International Application No. PCT/CN2019/116057, filed on Nov. 6, 2019, the disclosure of which is hereby incorporated by reference in its entirety.

TECHNICAL FIELD

This application relates to the field of wireless communications technologies, and specifically, to a measurement method using a synchronization signal block, a terminal device, and a base station.

BACKGROUND

To ensure a communication link between a base station and a terminal device, the terminal device usually needs to be managed. The management of the terminal device includes a plurality of forms, such as cell selection, cell reselection, and cell handover. Management in various forms is performed based on cell measurement. Therefore, cell measurement is a basis for managing the terminal device. Cell measurement is a technology in which a user equipment (UE) determines, based on an obtained reference signal transmitted by a cell, a quality parameter corresponding to the reference signal. The quality parameter includes reference signal received power (RSRP), reference signal received quality (RSRQ), a signal to interference plus noise ratio (SINR), and the like.

Currently, when a new radio (new-RAT, NR) system performs cell measurement, a synchronization signal/physical broadcast channel block (SS (synchronization signal)/PBCH block, SSB) may be used as a reference signal. The SSB may be referred to as a synchronization signal block for short. In this case, a base station of a to-be-measured cell transmits an SSB, and after measuring the SSB, a terminal device obtains a quality parameter corresponding to the SSB, thereby implementing cell measurement. Because the terminal device cannot determine a time domain location of the SSB transmitted by the to-be-measured cell, to reduce power consumption caused by unnecessary measurement of the terminal device, the NR system uses a concept of synchronization signal block-based measurement timing configuration (SS/PBCH block measurement time configuration, SMTC). The SMTC is configured by a base station of a serving cell. The base station of the serving cell obtains SSB information of a base station of a to-be-measured neighboring cell by interacting with the base station of the to-be-measured neighboring cell, to generate SMTC configuration information of the to-be-measured neighboring cell. After receiving the SMTC configuration message, the terminal device measures the to-be-measured neighboring cell in a measurement window determined based on the SMTC configuration information. The measurement window determined based on the SMTC configuration information may also be referred to as an SMTC window.

In addition, a conventional terrestrial network cannot provide seamless coverage for a terminal device. Especially in a place in which a base station cannot be deployed, such as a sea, a desert, or the sky, the conventional terrestrial network cannot meet a communication requirement of the terminal device. Therefore, currently, a non-terrestrial network (NTN) appears. The NTN uses a high-altitude platform or a satellite as a base station by deploying a base station or some base station functions on the high-altitude platform or the satellite, so that the high-altitude platform or the satellite provides seamless coverage for the terminal device. Referring to an example diagram of an NTN shown in FIG. 1, in FIG. 1, a satellite S1 and a satellite S2 are respectively used as two base stations to provide a communication service for a terminal device. When the terminal device is connected to the NTN, measurement may be performed by using an SSB.

When downlink signals of different base stations arrive at a terminal device, there may be a relatively large latency difference, and especially in an NTN, a latency difference between different base stations is usually more obvious. In this case, when the terminal device measures an SSB in an SMTC window configured by a base station of a serving cell, the terminal device may miss an SSB of a to-be-measured neighboring cell, and therefore cannot measure the to-be-measured neighboring cell. That is, the SMTC window configured by the base station of the serving cell may be invalid for measuring the to-be-measured neighboring cell.

SUMMARY

In a conventional technology, an SMTC window configured by a base station of a serving cell may be inapplicable to a to-be-measured neighboring cell. As a result, when measuring an SSB by using the SMTC window, a terminal device misses an SSB of the to-be-measured neighboring cell, and cannot measure the to-be-measured neighboring cell. To resolve this technical problem, embodiments of this application disclose a measurement method using a synchronization signal block, a terminal device, and a base station.

According to a first aspect, a measurement method using a synchronization signal block is provided. The method is applicable to a terminal device and includes determining a first adjustment parameter of a to-be-measured neighboring cell, determining, based on the first adjustment parameter, a first synchronization signal block-based measurement timing configuration SMTC window corresponding to the to-be-measured neighboring cell, and measuring the to-be-measured neighboring cell based on the first SMTC window.

According to the solution in this embodiment of this application, the terminal device determines, by using the first adjustment parameter of the to-be-measured neighboring cell, the first SMTC window used to measure the to-be-measured neighboring cell, and the terminal device can measure an SSB of the to-be-measured neighboring cell by using the first SMTC window, thereby measuring the to-be-measured neighboring cell.

In a possible implementation, the first adjustment parameter of the to-be-measured neighboring cell includes a latency difference between signals of a first base station and a second base station that are transmitted to the terminal device, and/or time domain location information of an SSB of the to-be-measured neighboring cell.

The first base station is a base station of a serving cell.

The second base station is a base station corresponding to the to-be-measured neighboring cell.

In a possible implementation, the method includes determining location information of the second base station based on a first identifier of the to-be-measured neighboring cell, and determining, based on location information of the first base station and the second base station, the latency difference between signals of the first base station and the second base station that are transmitted to the terminal device.

By using the foregoing steps, the terminal device can obtain the latency difference between signals of the first base station and the second base station that are transmitted to the terminal device, to determine the first SMTC window based on the latency difference.

In a possible implementation, the first identifier of the to-be-measured neighboring cell is from the first base station.

In a possible implementation, the method includes determining a time domain location of the SSB of the to-be-measured neighboring cell by separately measuring a primary synchronization signal PSS and/or a secondary synchronization signal SSS of the to-be-measured neighboring cell at different time domain locations.

By using the foregoing step, the terminal device can determine the time domain location of the SSB of the to-be-measured neighboring cell, to determine the first SMTC window based on the time domain location.

In a possible implementation, the method includes determining a first adjustment amount based on the latency difference, where the first adjustment amount includes at least one first adjustment value, and determining an offset of the first SMTC window based on the first adjustment amount and a second SMTC window, where the second SMTC window is configured by the first base station.

By using the foregoing steps, an offset of the second SMTC window can be adjusted based on the latency difference, to determine the first SMTC window.

In a possible implementation, one first adjustment value is used to indicate one adjustable value of the offset, or is used to indicate one adjustable range of the offset.

In a possible implementation, the method includes determining a second adjustment amount based on the latency difference, where the second adjustment amount includes at least one second adjustment value, and determining duration of the first SMTC window based on the second adjustment amount and the second SMTC window, where the second SMTC window is configured by the first base station.

By using the foregoing steps, duration of the second SMTC window can be adjusted based on the latency difference, to determine the first SMTC window.

In a possible implementation, one second adjustment value is used to indicate one adjustable value of the duration, or is used to indicate one adjustable range of the duration.

In a possible implementation, the method includes respectively determining a periodicity and duration of the first SMTC window based on a periodicity and duration of a second SMTC window, where the second SMTC window is configured by the first base station, and determining an offset of the first SMTC window based on a time domain location of the SSB of the to-be-measured neighboring cell.

By using the foregoing steps, the first SMTC window can be determined based on the time domain location of the SSB of the to-be-measured neighboring cell.

In a possible implementation, the method further includes determining a second adjustment parameter of the to-be-measured neighboring cell, and determining, based on the second adjustment parameter, a third SMTC window corresponding to the to-be-measured neighboring cell, and measuring the to-be-measured neighboring cell by using the third SMTC window.

In a possible implementation, before the first adjustment parameter of the to-be-measured neighboring cell is determined, the method further includes at least one of the following steps determining, based on first indication information from the first base station, that the second SMTC window is invalid, where the second SMTC window is configured by the first base station, and determining the location information of the second base station based on the first identifier of the to-be-measured neighboring cell, and determining, based on the location information of the second base station, that a distance difference between a first distance and a second distance is greater than a first threshold, where the first base station is the base station of the serving cell, the second base station is the base station corresponding to the to-be-measured neighboring cell, the first distance is a distance at which a signal of the first base station is transmitted to the terminal device, and the second distance is a distance at which a signal of the second base station is transmitted to the terminal device.

By using the foregoing steps, when receiving the first indication information from the first base station, the terminal device can determine that the second SMTC window is invalid, to determine the first SMTC window corresponding to the to-be-measured neighboring cell.

According to a second aspect, a measurement method using a synchronization signal block is provided. The method is applicable to a first base station, the first base station is a base station of a serving cell in which a terminal device is located, and the method includes determining second indication information, where the second indication information is used to indicate that a fourth SMTC window is invalid for measuring a to-be-measured neighboring cell, and sending the second indication information to the terminal device.

By using the foregoing steps, when the fourth SMTC window is invalid for measuring the to-be-measured neighboring cell, the first base station can send the second indication information to the terminal device, so that after receiving the second indication information, the terminal device determines an SMTC window corresponding to the to-be-measured neighboring cell.

In a possible implementation, the method further includes determining a first distance and a second distance based on location information of the terminal device, the first base station, and a second base station, where the second base station is a base station corresponding to the to-be-measured neighboring cell, the first distance is a distance at which a signal of the first base station is transmitted to the terminal device, and the second distance is a distance at which a signal of the second base station is transmitted to the terminal device, and determining the second indication information when a difference between the first distance and the second distance is greater than a second threshold.

By using the foregoing steps, the first base station can determine, based on location information of the first base station and the second base station, whether the second indication information needs to be determined.

According to a third aspect, a measurement method using a synchronization signal block is provided. The method is applicable to a first base station, the first base station is a base station of a serving cell in which a terminal device is located, and the method includes determining a second identifier of a to-be-measured neighboring cell, where the to-be-measured neighboring cell is a cell to be measured by the terminal device by using a synchronization signal block, and sending the second identifier to the terminal device.

By using the foregoing steps, the first base station can send the second identifier of the to-be-measured neighboring cell to the terminal device, so that the terminal device implements, based on the second identifier of the to-bemeasured neighboring cell, positioning of a second base station corresponding to the to-be-measured neighboring cell.

According to a fourth aspect, a measurement method using a synchronization signal block is provided. The method is applicable to a terminal device and includes sending first location information to a first base station, where the first location information is used to indicate a location of the terminal device, and the first base station is a base station of a serving cell, receiving fifth SMTC configuration information, where the fifth SMTC configuration information includes a configuration parameter that is of a fifth SMTC window and that is determined by the first base station based on the first location information, and the fifth SMTC window is used to measure a to-be-measured neighboring cell, and measuring the to-be-measured neighboring cell by using the fifth SMTC window.

In a possible implementation, the method further includes sending first report information to the first base station, where the first report information includes at least one of the following location information of the terminal device, SMTC window configuration request information, and neighboring cell SSB detection failure information.

According to a fifth aspect, a measurement method using a synchronization signal block is provided. The method is applicable to a first base station, the first base station is a base station of a serving cell of a terminal device, and the method includes receiving second location information from the terminal device, where the second location information is used to indicate a location of the terminal device, determining a transmission latency difference between a first distance and a second distance based on the second location information of the terminal device, the first distance, and the second distance, where the first distance is a distance at which a signal of the first base station is transmitted to the terminal device, the second distance is a distance at which a signal of a second base station is transmitted to the terminal device, and the second base station is a base station corresponding to a to-be-measured neighboring cell, determining, based on the latency difference, a sixth SMTC window used to perform synchronization signal block measurement on the to-be-measured neighboring cell, and sending sixth SMTC configuration information including a configuration parameter of the sixth SMTC window to the terminal device.

In a possible implementation, the method further includes sending a third identifier to the terminal device, where the third identifier is used to indicate the to-be-measured neighboring cell corresponding to the sixth SMTC configuration information.

In a possible implementation, before the determining, based on the latency difference, a sixth SMTC window used to perform synchronization signal block measurement on the to-be-measured neighboring cell, the method further includes determining, based on the latency difference, that a seventh SMTC window is invalid for the to-be-measured neighboring cell, where the seventh SMTC window is a preconfigured SMTC window used to perform synchronization signal block measurement on the to-be-measured neighboring cell.

According to a sixth aspect, a terminal device is provided, including a processing module, where the processing module is configured to determine a first adjustment parameter of a to-be-measured neighboring cell, determine, based on the first adjustment parameter, a first synchronization signal block-based measurement timing configuration SMTC window corresponding to the to-be-measured neighboring cell, and measure the to-be-measured neighboring cell based on the first SMTC window.

In a possible implementation, the first adjustment parameter of the to-be-measured neighboring cell includes a latency difference between signals of a first base station and a second base station that are transmitted to the terminal device, and/or time domain location information of an SSB of the to-be-measured neighboring cell.

The first base station is a base station of a serving cell.

The second base station is a base station corresponding to the to-be-measured neighboring cell.

In a possible implementation, the processing module is configured to determine location information of the second base station based on a first identifier of the to-be-measured neighboring cell, and determine, based on location information of the first base station and the second base station, the latency difference between signals of the first base station and the second base station that are transmitted to the terminal device.

In a possible implementation, the terminal device further includes a receiving module, where the receiving module is configured to receive the first identifier, and the first identifier is from the first base station.

In a possible implementation, the processing module is configured to determine a time domain location of the SSB of the to-be-measured neighboring cell by separately measuring a primary synchronization signal PSS and/or a secondary synchronization signal SSS of the to-be-measured neighboring cell at different time domain locations.

In a possible implementation, the processing module is configured to determine a first adjustment amount based on the latency difference, where the first adjustment amount includes at least one first adjustment value, and determine an offset of the first SMTC window based on the first adjustment amount and a second SMTC window, where the second SMTC window is configured by the first base station.

In a possible implementation, the processing module is configured to determine a second adjustment amount based on the latency difference, where the second adjustment amount includes at least one second adjustment value, and determine duration of the first SMTC window based on the second adjustment amount and the second SMTC window, where the second SMTC window is configured by the first base station.

In a possible implementation, a periodicity and duration of the first SMTC window are respectively determined based on a periodicity and duration of a second SMTC window, where the second SMTC window is configured by the first base station, and an offset of the first SMTC window is determined based on a time domain location of the SSB of the to-be-measured neighboring cell.

In a possible implementation, the processing module is further configured to before determining the first adjustment parameter of the to-be-measured neighboring cell, determine, based on first indication information from the first base station, that the second SMTC window is invalid, where the second SMTC window is configured by the first base station, and determine the location information of the second base station based on the first identifier of the to-be-measured neighboring cell, and determine, based on the location information of the second base station, that a distance difference between a first distance and a second distance is greater than a first threshold, where the first base station is the base station of the serving cell, the second base station is the base station corresponding to the to-be-measured neighboring cell, the first distance is a distance at which a signal of the first base station is transmitted to the terminal device, and the second distance is a distance at which a signal of the second base station is transmitted to the terminal device.

According to a seventh aspect, a base station is provided. The base station is a first base station of a serving cell in which a terminal device is located, and includes a processing module, configured to determine second indication information, where the second indication information is used to indicate that a fourth SMTC window is invalid for measuring a to-be-measured neighboring cell, and a sending module, configured to send the second indication information to the terminal device.

In a possible implementation, the processing module is further configured to determine a first distance and a second distance based on location information of the terminal device, the first base station, and a second base station, where the second base station is a base station corresponding to the to-be-measured neighboring cell, the first distance is a distance at which a signal of the first base station is transmitted to the terminal device, and the second distance is a distance at which a signal of the second base station is transmitted to the terminal device, and determine the second indication information when a difference between the first distance and the second distance is greater than a second threshold.

According to an eighth aspect, a base station is provided. The base station is a first base station of a serving cell in which a terminal device is located, and includes a processing module, configured to determine a second identifier of a to-be-measured neighboring cell, where the to-be-measured neighboring cell is a cell to be measured by the terminal device by using a synchronization signal block, and a sending module, configured to send the second identifier to the terminal device.

According to a ninth aspect, a terminal device is provided, including a sending module, configured to send first location information to a first base station, where the first location information is used to indicate a location of the terminal device, and the first base station is a base station of a serving cell, a receiving module, configured to receive fifth SMTC configuration information, where the fifth SMTC configuration information includes a configuration parameter that is of a fifth SMTC window and that is determined by the first base station based on the first location information, and the fifth SMTC window is used to measure a to-be-measured neighboring cell, and a processing module, configured to measure the to-be-measured neighboring cell by using the fifth SMTC window.

According to a tenth aspect, a base station is provided. The base station is a first base station of a serving cell in which a terminal device is located, and includes a receiving module, configured to receive second location information from the terminal device, where the second location information is used to indicate a location of the terminal device, a processing module, configured to determine a transmission latency difference between a first distance and a second distance based on the second location information of the terminal device, the first distance, and the second distance, where the first distance is a distance at which a signal of the first base station is transmitted to the terminal device, the second distance is a distance at which a signal of a second base station is transmitted to the terminal device, and the second base station is a base station corresponding to a to-be-measured neighboring cell, where the processing module is further configured to determine, based on the latency difference, a sixth SMTC window used to perform synchronization signal block measurement on the to-be-measured neighboring cell, and a sending module, configured to send sixth SMTC configuration information including a configuration parameter of the sixth SMTC window to the terminal device.

In a possible implementation, the sending module is further configured to send a third identifier to the terminal device, where the third identifier is used to indicate the to-be-measured neighboring cell corresponding to the sixth SMTC configuration information.

According to an eleventh aspect, a computer readable storage medium is provided. The computer readable storage medium stores instructions. When the instructions are run on a computer, the computer is enabled to perform the method according to any one of the first aspect or the possible implementations of the first aspect.

According to a twelfth aspect, a computer readable storage medium is provided. The computer readable storage medium stores instructions. When the instructions are run on a computer, the computer is enabled to perform the method according to any one of the second aspect or the possible implementations of the second aspect.

According to a thirteenth aspect, a computer readable storage medium is provided. The computer readable storage medium stores instructions. When the instructions are run on a computer, the computer is enabled to perform the method according to any one of the third aspect or the possible implementations of the third aspect.

According to a fourteenth aspect, a computer readable storage medium is provided. The computer readable storage medium stores instructions. When the instructions are run on a computer, the computer is enabled to perform the method according to any one of the fourth aspect or the possible implementations of the fourth aspect.

According to a fifteenth aspect, a computer readable storage medium is provided. The computer readable storage medium stores instructions. When the instructions are run on a computer, the computer is enabled to perform the method according to any one of the fifth aspect or the possible implementations of the fifth aspect.

According to a sixteenth aspect, a computer program product including instructions is provided. The computer program product is configured to store computer instructions. When the computer instructions are run on a computer, the computer is enabled to perform the method according to any one of the first aspect or the possible implementations of the first aspect.

According to a seventeenth aspect, a computer program product including instructions is provided. The computer program product is configured to store computer instructions. When the computer instructions are run on a computer, the computer is enabled to perform the method according to any one of the second aspect or the possible implementations of the second aspect.

According to an eighteenth aspect, a computer program product including instructions is provided. The computer program product is configured to store computer instructions. When the computer instructions are run on a computer, the computer is enabled to perform the method according to any one of the third aspect or the possible implementations of the third aspect.

According to a nineteenth aspect, a computer program product including instructions is provided. The computer program product is configured to store computer instructions. When the computer instructions are run on a computer, the computer is enabled to perform the method according to any one of the fourth aspect or the possible implementations of the fourth aspect.

According to a twentieth aspect, a computer program product including instructions is provided. The computer program product is configured to store computer instructions. When the computer instructions are run on a computer, the computer is enabled to perform the method according to any one of the fifth aspect or the possible implementations of the fifth aspect.

According to a twenty-first aspect, a measurement apparatus using a synchronization signal block is provided. The measurement apparatus using a synchronization signal block is, for example, the terminal device according to the first aspect or the fourth aspect. The measurement apparatus using a synchronization signal block includes a processor. Optionally, the measurement apparatus using a synchronization signal block may further include a memory, configured to store computer instructions. The processor and the memory are coupled to each other, and are configured to implement the method according to the first aspect or the possible implementations. Alternatively, the measurement apparatus using a synchronization signal block may not include a memory, and the memory may be located outside the measurement apparatus using a synchronization signal block. Optionally, the measurement apparatus using a synchronization signal block may further include a communications interface, configured to communicate with another apparatus or device. The processor, the memory, and the communications interface are coupled to each other, and are configured to implement the method according to the first aspect or the possible implementations of the first aspect, or the method according to the fourth aspect or the possible implementations of the fourth aspect. For example, when the processor executes the computer instructions stored in the memory, the measurement apparatus using a synchronization signal block is enabled to perform the method according to any one of the first aspect or the possible implementations of the first aspect, or the measurement apparatus using a synchronization signal block is enabled to perform the method according to any one of the fourth aspect or the possible implementations of the fourth aspect. For example, the measurement apparatus using a synchronization signal block is a terminal device, or a chip or another component disposed in the terminal device.

If the measurement apparatus using a synchronization signal block is a terminal device, the communications interface is implemented, for example, by using a transceiver (or a transmitter and a receiver) in the terminal device. For example, the transceiver is implemented by using an antenna, a feeder, a codec, or the like in the terminal device. Alternatively, if the measurement apparatus using a synchronization signal block is a chip disposed in the terminal device, the communications interface is, for example, an input/output interface such as an input/output pin of the chip, and the communications interface is connected to a radio frequency transceiver component in the terminal device, to implement information receiving and sending by using the radio frequency transceiver component.

According to a twenty-second aspect, a measurement apparatus using a synchronization signal block is provided. The measurement apparatus using a synchronization signal block is, for example, the base station according to the second aspect, the third aspect, or the fifth aspect. The measurement apparatus using a synchronization signal block includes a processor. Optionally, the measurement apparatus using a synchronization signal block may further include a memory, configured to store computer instructions. The processor and the memory are coupled to each other, and are configured to implement the method according to the second aspect or the possible implementations of the second aspect, the method according to the third aspect or the possible implementations of the third aspect, or the method according to the fifth aspect or the possible implementations of the fifth aspect. Alternatively, the measurement apparatus using a synchronization signal block may not include a memory, and the memory may be located outside the measurement apparatus using a synchronization signal block. Optionally, the measurement apparatus using a synchronization signal block may further include a communications interface, configured to communicate with another apparatus or device. The processor, the memory, and the communications interface are coupled to each other, and are configured to implement the method according to the second aspect or the possible implementations of the second aspect, the method according to the third aspect or the possible implementations of the third aspect, or the method according to the fifth aspect or the possible implementations of the fifth aspect. For example, when the processor executes the computer instructions stored in the memory, the measurement apparatus using a synchronization signal block is enabled to perform the method according to any one of the second aspect or the possible implementations of the second aspect, the method according to any one of the third aspect or the possible implementations of the third aspect, or the method according to any one of the fifth aspect or the possible implementations of the fifth aspect. For example, the measurement apparatus using a synchronization signal block is a base station, or a chip or another component disposed in the base station.

If the measurement apparatus using a synchronization signal block is a base station, the communications interface is implemented, for example, by using a transceiver (or a transmitter and a receiver) in the base station. For example, the transceiver is implemented by using an antenna, a feeder, a codec, or the like in the base station. Alternatively, if the measurement apparatus using a synchronization signal block is a chip disposed in the base station, the communications interface is, for example, an input/output interface such as an input/output pin of the chip, and the communications interface is connected to a radio frequency transceiver component in the base station, to implement information receiving and sending by using the radio frequency transceiver component.

According to a twenty-third aspect, a communications system is provided. The communications system includes the terminal device according to the first aspect or the terminal device according to the fourth aspect, and includes the base station according to the second aspect, the base station according to the third aspect, or the base station according to the fifth aspect.

According to the solutions in embodiments of this application, the terminal device determines, by using the first adjustment parameter of the to-be-measured neighboring cell, the first SMTC window used to measure the to-be-measured neighboring cell, and the terminal device can measure the SSB of the to-be-measured neighboring cell by using the first SMTC window, thereby measuring the to-be-measured neighboring cell.

Therefore, the solutions in embodiments of this application can resolve a problem that the SSB of the to-be-measured neighboring cell is missed when the to-be-measured neighboring cell is measured by using an SMTC window that is not applicable to the to-be-measured neighboring cell. Compared with the conventional technology, even if there is a relatively large difference between propagation latencies from the base station of the serving cell and the base station of the to-be-measured neighboring cell to the terminal device, the to-be-measured neighboring cell can be measured by using the solutions in embodiments of this application.

BRIEF DESCRIPTION OF THE DRAWINGS

To describe the technical solutions in this application more clearly, the following briefly describes the accompanying drawings required for describing embodiments. It is clear that a person of ordinary skill in the art may derive other drawings from these accompanying drawings without creative efforts.

FIG. 2(a) to FIG. 2(d) are a schematic diagram of an application of an SMTC window in the conventional technology;

FIG. 3 is a schematic diagram of a working procedure of a measurement method using a synchronization signal block according to an embodiment of this application;

FIG. 7(a) to FIG. 7(c) are a schematic diagram of an application effect of another SMTC window according to an embodiment of this application;

FIG. 8 is a schematic diagram of a working procedure of another measurement method using a synchronization signal block according to an embodiment of this application;

DETAILED DESCRIPTION OF ILLUSTRATIVE EMBODIMENTS

Figure 1:
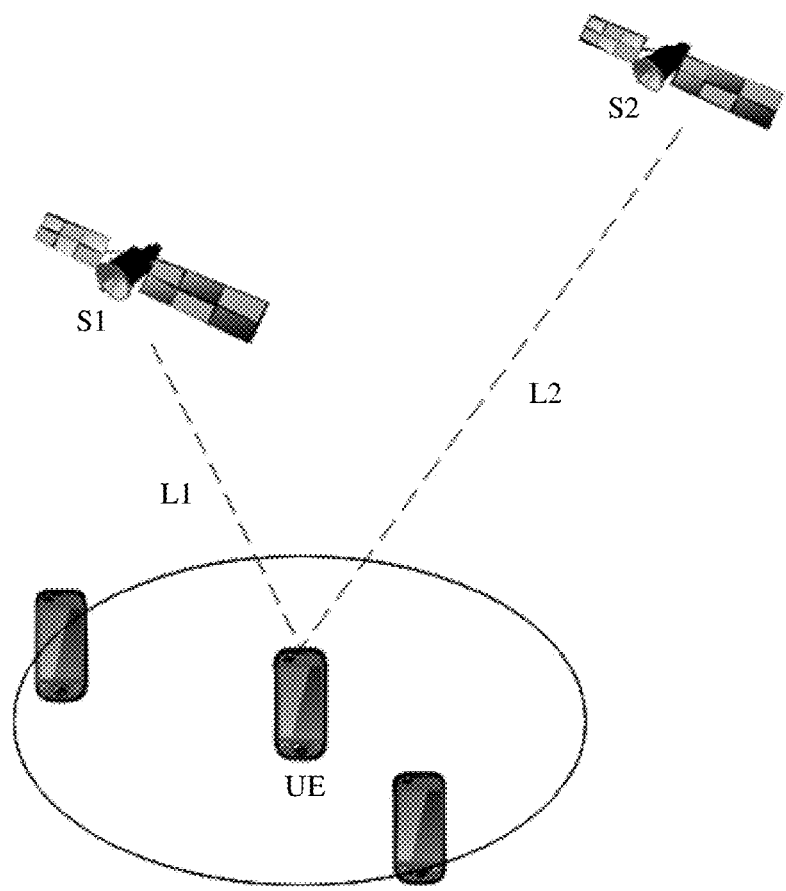
FIG. 1 is a schematic diagram of an application scenario of a non-terrestrial network disclosed in a conventional technology.

To make objectives, technical solutions and advantages of embodiments of this application clearer, the following further describes embodiments of this application in detail with reference to the accompanying drawings.

In the following descriptions, some terms in embodiments of this application are described, to help a person skilled in the art have a better understanding.

(1) Terminal device: The terminal device includes a device that provides voice and/or data connectivity for a user. Specifically, the terminal device includes a device that provides voice for the user, a device that provides data connectivity for the user, or a device that provides voice and data connectivity for the user. For example, the terminal device may include a handheld device having a wireless connection function or a processing device connected to a wireless modem. The terminal device may communicate with a core network over a radio access network (RAN), and exchange voice or data with the RAN, or exchange voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine-type-communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus, for example, a device such as a personal communications service (personal communications service, PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capacity, or a device with a limited computing capability. For example, the terminal device includes an information sensing device such as a barcode, radio frequency identification (RFID), a sensor, a global positioning system (GPS), or a laser scanner.

By way of example rather than limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device directly worn by a user or integrated into clothes or an accessory of a user. The wearable device is more than a hardware device, and implements powerful functions through software support, data interaction, and cloud interaction. In a broad sense, wearable intelligent devices include full-featured and large-sized devices that can implement all or some functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

In embodiments of this application, the terminal device may further include a relay Alternatively, it may be understood that any device that can perform data communication with a base station may be considered as the terminal device.

In embodiments of this application, an apparatus configured to implement a terminal device function may be a terminal device, or may be an apparatus such as a chip system that can support the terminal device in implementing the function. The apparatus may be installed in the terminal device. In embodiments of this application, a chip system may include a chip, or may include a chip and another discrete component. In the technical solutions provided in embodiments of this application, the technical solutions provided in embodiments of this application are described by using an example in which an apparatus configured to implement a terminal function is a terminal device.

In embodiments of this application, the terminal device can implement wireless communication by exchanging information with a base station.

(2) Base station: The base station is an access network (AN) device and can communicate with a wireless terminal device by using one or more cells over an air interface in an access network. The base station may be configured to perform mutual conversion between a received over-the-air frame and an IP packet, and serve as a router between the terminal device and a remaining part of the access network.

For example, the base station may include an evolved NodeB (eNB, or e-NodeB, evolved NodeB) in a long term evolution (LTE) system or a long term evolution-advanced (LTE-A) system, may include a next generation NodeB (gNB) in a 5th generation (5G) new radio (NR) system (also briefly referred to as an NR system), or may include a centralized unit (CU) and a distributed unit (DU) in a cloud radio access network (Cloud RAN) system. This is not limited in embodiments of this application.

In embodiments of this application, an apparatus configured to implement a base station function may be a base station, or may be an apparatus such as a chip system that can support the base station in implementing the function. The apparatus may be installed in the base station. In the technical solutions provided in embodiments of this application, the technical solutions provided in embodiments of this application are described by using an example in which an apparatus configured to implement a base station function is a base station.

In a conventional technology, an SS/PBCH block-based measurement timing configuration (SS/PBCH block measurement time configuration, SMTC) window configured by a base station of a serving cell may be invalid for measuring a to-be-measured neighboring cell. As a result, when measuring a synchronization signal block by using the SMTC window, a terminal device misses a synchronization signal block of the to-be-measured neighboring cell, and therefore cannot measure the to-be-measured neighboring cell. To resolve this technical problem, embodiments of this application disclose a measurement method using a synchronization signal block, a terminal device, and a base station. In embodiments of this application, the synchronization signal block generally refers to a synchronization signal/physical broadcast channel block (SS/PBCH block, SSB).

In embodiments of this application, that an SMTC window is invalid for a to-be-measured neighboring cell means that when the to-be-measured neighboring cell is measured by using the SMTC window, an SSB of the to-be-measured neighboring cell is missed, and the to-be-measured neighboring cell cannot be measured. It may also be understood that an SMTC window is not applicable to measurement of the to-be-measured neighboring cell.

To clarify the solutions of this application, the SMTC window is described below.

In embodiments of this application, a base station of a serving cell may generate SMTC configuration information, and the SMTC configuration information generally includes the following configuration parameters, including a periodicity, an offset, duration, and the like. In addition, the base station of the serving cell transmits the SMTC configuration information to a terminal device. The terminal device determines a corresponding measurement window based on the configuration parameters included in the SMTC configuration information, and measures a to-be-measured neighboring cell in the measurement window. That is, the measurement window is a series of measurement execution occasions determined by the terminal device based on the SMTC configuration information delivered by the base station of the serving cell. In embodiments of this application, the measurement window may also be referred to as an SMTC window.

After receiving the SMTC configuration information, the terminal device periodically measures an SSB of a to-be-measured cell in an SMTC window determined based on the configuration parameter periodicity included in the SMTC configuration information. In an NR system, a periodicity of the SMTC window is generally 5 ms, 10 ms, 20 ms, 40 ms, 80 ms, 160 ms, or the like. In addition, an offset of an SMTC window is used to determine a start occasion of each SMTC window, and a time domain location at which the SSB starts to be measured may be determined based on the offset of the SMTC window. For example, in FIG. 2(a) to FIG. 2(d), a location of a vertical box on a left side of a rectangular box filled with slashes is a time domain location that is determined based on the offset of the SMTC window and at which measurement starts to be performed. Duration of an SMTC window may also be referred to as a length of the SMTC window, and is used to indicate duration for continuously performing measurement by the terminal device in each periodicity. A granularity of the duration of the SMTC window is generally 1 ms. In the NR system, a value of the duration of the SMTC window is generally 1 ms, 2 ms, 3 ms, 4 ms, 5 ms, or the like.

That is, after receiving the SMTC configuration information, the terminal device determines, based on the configuration parameter offset included in the SMTC configuration information, a time domain location at which measurement starts to be performed, determines, based on the configuration parameter duration included in the SMTC configuration information, duration for continuously performing measurement, and determines, based on the configuration parameter periodicity included in the SMTC configuration information, a periodicity for performing measurement. In other words, the terminal device measures the to-be-measured neighboring cell based on the measurement window determined based on the configuration parameters such as the periodicity, the duration, and the offset included in the SMTC configuration information. The measurement window is an SMTC window in this application.

In a process of performing cell measurement, a to-be-measured cell may transmit an SSB, and the terminal device performs cell measurement based on the SSB. However, because the terminal device does not know an exact time domain location of the SSB of the to-be-measured cell, if the terminal device keeps measuring the SSB, relatively large power consumption is caused. Therefore, the terminal device considers that an SSB of a to-be-measured neighboring cell is transmitted only in a window determined based on an SMTC configuration. In this case, the terminal device may measure the SSB of the to-be-measured neighboring cell only in a time corresponding to an SMTC window, and does not need to keep measuring the SSB of the to-be-measured neighboring cell, thereby reducing power consumption of the terminal device.

Generally, when the terminal device is in an idle state, the base station may determine a system message including the SMTC configuration information, and deliver the system message including the SMTC configuration information to the terminal device. When the terminal device is in a connected state, the base station may determine radio resource control (RRC) information including the SMTC configuration information, and deliver the RRC information including the SMTC configuration information to the terminal device. After obtaining the SMTC configuration information sent by the base station, the terminal device determines a corresponding SMTC window based on the configuration parameters included in the SMTC configuration information, and measures an SSB of a to-be-measured cell only in the SMTC window, thereby reducing power consumption of the terminal device.

In addition, when there is a relatively large difference between a distance between the base station of the serving cell and the terminal device and a distance between a base station of the to-be-measured neighboring cell and the terminal device, there is a relatively large latency difference when downlink signals of the base station of the serving cell and the base station of the to-be-measured neighboring cell are separately transmitted to the terminal device. When the terminal device measures the SSB of the to-be-measured neighboring cell by using the SMTC configuration information sent by the base station of the serving cell, the SSB of the to-be-measured neighboring cell may be missed, that is, the SMTC window configured by the base station of the serving cell may be not applicable to the to-be-measured neighboring cell. As a result, the terminal device cannot measure the SSB of the to-be-measured neighboring cell. The to-be-measured neighboring cell is a cell that needs to be measured and that is adjacent to the serving cell.

For example, in an application scenario shown in FIG. 1, a satellite S1 serves as a base station gNB1 of a serving cell, and a satellite S2 serves as a base station gNB2 of a to-be-measured neighboring cell. A downlink signal of the gNB1 passes through a distance L1 between the satellite S1 and a terminal device, and arrives at the terminal device after a latency of a time Tp1. A downlink signal of the gNB2 passes through a distance L2 between the satellite S2 and the terminal device, and arrives at the terminal device after a latency of a time Tp2. There is a relatively large difference between Tp1 and Tp2. In this case, refer to a schematic diagram shown in FIG. 2(a) to FIG. 2(d). In FIG. 2(a) to FIG. 2(d), a horizontal axis represents a time, an unshaded rectangular box represents a downlink signal, a rectangular box filled with slashes represents an SMTC window, and a solid rectangular box represents an SSB. FIG. 2(a) shows a downlink signal (that is, an unshaded rectangular box) periodically transmitted by the gNB1, where a rectangular box filled with slashes is an SMTC window configured by the gNB1. FIG. 2(b) shows a downlink signal of the gNB1 that arrives at the terminal device after the latency of the time Tp1. FIG. 2(c) shows a downlink signal (that is, an unshaded rectangular box) sent by the gNB2, and the downlink signal includes an SSB (that is, a solid rectangular box) of the gNB2. FIG. 2(d) shows a downlink signal of the gNB2 that arrives at the terminal device after the latency of the time Tp2, where a rectangular box filled with slashes represents an SMTC window configured by the gNB1. It can be learned from FIG. 2(d) that, because a difference ΔTp between Tp1 and Tp2 is relatively large, the SSB of the gNB2 is not in the SMTC window configured by the gNB1. In this case, when measuring the gNB2 by using the SMTC window configured by the gNB1, the terminal device cannot measure the SSB of the gNB2, that is, misses the SSB of the gNB2, and therefore cannot measure the gNB2.

To resolve the foregoing problem, embodiments of this application disclose a measurement method using a synchronization signal block, a terminal device, and a base station. In embodiments, a base station of a serving cell is referred to as a first base station, and a base station corresponding to a to-be-measured neighboring cell is referred to as a second base station.

The measurement method using a synchronization signal block disclosed in embodiments of this application is applicable to a terminal device. Referring to a schematic diagram of a working procedure shown in FIG. 3, the measurement method using a synchronization signal block includes the following steps.

Step S11: Determine a first adjustment parameter of a to-be-measured neighboring cell.

Step S12: Determine, based on the first adjustment parameter, a first synchronization signal block-based measurement timing configuration SMTC window corresponding to the to-be-measured neighboring cell.

In this embodiment of this application, the terminal device measures the to-be-measured neighboring cell by using a synchronization signal block, where the synchronization signal block is generally an SSB.

In addition, the terminal device can determine, based on the first adjustment parameter, the first SMTC window corresponding to the to-be-measured neighboring cell, and the first SMTC window corresponding to the to-be-measured neighboring cell is an SMTC window used by the terminal device to measure the to-be-measured neighboring cell. A time domain location of the first SMTC window covers a time domain location at which an SSB of the to-be-measured neighboring cell arrives at the terminal device, so that the SSB of the to-be-measured neighboring cell can be measured in a process of measuring the to-be-measured neighboring cell, thereby measuring the to-be-measured neighboring cell.

Step S13: Measure the to-be-measured neighboring cell based on the first SMTC window.

In this embodiment of this application, that the terminal device measures the to-be-measured neighboring cell based on the first SMTC window generally means that the terminal device measures the SSB of the to-be-measured neighboring cell based on the first SMTC window, and obtains a quality parameter corresponding to the to-be-measured neighboring cell. The quality parameter may include at least one of RSRP, RSRQ, and an SINR.

In this embodiment of this application, the terminal device can determine the first adjustment parameter of the to-be-measured neighboring cell, determine, based on the first adjustment parameter, the first synchronization signal block-based measurement timing configuration SMTC window corresponding to the to-be-measured neighboring cell, and then measure the to-be-measured neighboring cell based on the first SMTC window.

According to the solution in this embodiment of this application, the terminal device determines, by using the first adjustment parameter of the to-be-measured neighboring cell, the first SMTC window used to measure the to-be-measured neighboring cell, and the terminal device can measure the SSB of the to-be-measured neighboring cell by using the first SMTC window, thereby measuring the to-be-measured neighboring cell.

Therefore, the solution in this embodiment of this application can resolve a problem that the SSB of the to-be-measured neighboring cell is missed when the to-be-measured neighboring cell is measured by using an SMTC window that is not applicable to the to-be-measured neighboring cell. Compared with a conventional technology, even if there is a relatively large difference between propagation latencies from the base station of the serving cell and the base station of the to-be-measured neighboring cell to the terminal device, the to-be-measured neighboring cell can be measured by using the solution in this embodiment of this application.

In this embodiment of this application, there may be one or more to-be-measured neighboring cells. When there are a plurality of to-be-measured neighboring cells, the terminal device may determine a plurality of SMTC windows, and measure one or more to-be-measured neighboring cells in each SMTC window, to meet measurement requirements of different to-be-measured neighboring cells.

In addition, generally, a range of a cell is relatively large. In this case, for terminal devices located at different locations of the cell, latency differences between transmission latencies that are between the base station of the serving cell and the terminal devices and transmission latencies that are between the base station of the to-be-measured neighboring cell and the terminal devices may also be different. Therefore, different terminal devices may perform the solution disclosed in this embodiment of this application, to determine first SMTC windows applicable to the to-be-measured neighboring cell when measuring the to-be-measured neighboring cell, thereby measuring the to-be-measured neighboring cell.

In this embodiment of this application, the first SMTC window is determined based on the first adjustment parameter, and the first adjustment parameter may be a plurality of types of parameters. Generally, the first adjustment parameter of the to-be-measured neighboring cell includes a latency difference between signals of a first base station and a second base station that are transmitted to the terminal device, and/or time domain location information of an SSB of the to-be-measured neighboring cell. The first base station is the base station of the serving cell. The second base station is the base station corresponding to the to-be-measured neighboring cell.

In this embodiment of this application, different types of first adjustment parameters may be determined in different manners. When the latency difference between signals of the first base station and the second base station that are transmitted to the terminal device needs to be obtained, the following steps generally include first determining location information of the second base station based on a first identifier of the to-be-measured neighboring cell, and then determining, based on location information of the first base station and the second base station, the latency difference between signals of the first base station and the second base station that are transmitted to the terminal device.

The first identifier of the to-be-measured neighboring cell is generally from the first base station. In a feasible implementation, the first identifier of the to-be-measured neighboring cell is included in SMTC configuration information sent by the first base station to the terminal device.

The first identifier of the to-be-measured neighboring cell is used to implement positioning of the second base station, that is, determine the location information of the second base station. In addition, the first identifier of the to-be-measured neighboring cell may be an identifier ID of the to-be-measured neighboring cell, or may be another parameter of the to-be-measured neighboring cell. When a base station function of the to-be-measured neighboring cell is deployed on a satellite, the first identifier of the to-be-measured neighboring cell may alternatively be an ID of a satellite corresponding to the to-be-measured neighboring cell. This is not limited in this embodiment of this application.

After obtaining the first identifier of the to-be-measured neighboring cell, the terminal device may determine the location information of the second base station by querying a correspondence between the first identifier of the to-be-measured neighboring cell and the location information of the second base station. For example, when the base station function of the to-be-measured neighboring cell is deployed on a satellite, and the first identifier is the ID of the to-be-measured neighboring cell, the terminal device may determine a satellite ID based on the first identifier and a correspondence between the ID of the to-be-measured neighboring cell and the satellite ID. The satellite ID is an ID of the second base station. Then, a location of the second base station is determined based on the satellite ID.

In addition, because the first base station is the base station of the serving cell of the terminal device, the terminal device may further determine an identifier of the first base station, and determine location information of the first base station based on a correspondence between the identifier of the first base station and the location information of the first base station.

Then, the terminal device determines, based on location information of the terminal device and the location information of the first base station and the second base station, the latency difference between signals of the first base station and the second base station that are transmitted to the terminal device.

When the base station function of the to-be-measured neighboring cell is deployed on a satellite, and the first identifier of the to-be-measured neighboring cell is an ID of a satellite corresponding to the to-be-measured neighboring cell, the correspondence between the first identifier of the to-be-measured neighboring cell and the location information of the second base station may be determined by querying an ephemeris. The ephemeris is used to display a correspondence between a satellite location and the first identifier of the to-be-measured neighboring cell at a specific moment. In this case, the terminal device first determines the satellite ID based on the first identifier and a correspondence between the ID of the to-be-measured neighboring cell and the satellite ID, and then determines a location corresponding to the satellite ID by querying a location of each satellite displayed in the ephemeris. The location is the location of the second base station.

In addition, there may be a plurality of to-be-measured neighboring cells. In this case, the first identifier of the to-be-measured neighboring cell may be further used to indicate a relationship between the first SMTC window determined by the terminal device and the to-be-measured neighboring cell. For example, the first identifier may be included in the SMTC configuration information, and the SMTC configuration information includes a configuration parameter corresponding to a second SMTC window. That is, the SMTC configuration information includes both the configuration parameter corresponding to the second SMTC window and the first identifier of the to-be-measured neighboring cell. In this case, after receiving the SMTC configuration information, the terminal device may determine the second SMTC window by using the configuration parameter in the SMTC configuration information, and then determine the first SMTC window by adjusting the second SMTC window. The first SMTC window is an SMTC window applicable to the to-be-measured neighboring cell corresponding to the first identifier included in the SMTC configuration information.

Specifically, when the terminal device determines, based on the location information of the first base station and the second base station, the latency difference between signals of the first base station and the second base station that are transmitted to the terminal device, the terminal device first determines a first distance and a second distance, and then the terminal device determines the latency difference based on a speed of light, the first distance, and the second distance. The first distance is a distance at which a signal of the first base station is transmitted to the terminal device, and the second distance is a distance at which a signal of the second base station is transmitted to the terminal device.

The first distance and the second distance are respectively determined based on distances at which signals of the first base station and the second base station are transmitted to the terminal device. In an example shown in FIG. 2(a) to FIG. 2(d), when the first base station is a satellite S1 and the second base station is a satellite S2, the first distance may be a distance L1 between the satellite S1 and the terminal device, and the second distance may be a distance L2 between the satellite S2 and the terminal device. In addition, when the second base station is disposed at another location (for example, on the ground), and an antenna function of the second base station is deployed on the satellite S2, when the second base station transmits a signal to the terminal device, the signal is forwarded to the terminal device by the satellite S2. In this case, the second distance is a sum of a distance between the second base station and the satellite S2 and a distance between the satellite S2 and the terminal device.

In addition, when the time domain location information of the SSB of the to-be-measured neighboring cell needs to be determined, the following step may be included, including determining a time domain location of the SSB of the to-be-measured neighboring cell by separately measuring a primary synchronization signal (PSS) and/or a secondary synchronization signal (SSS) of the to-be-measured neighboring cell at different time domain locations.

By using the foregoing steps, the terminal device can determine the latency difference between signals of the first base station and the second base station that are transmitted to the terminal device and/or the time domain location information of the SSB of the to-be-measured neighboring cell. Based on the latency difference between signals of the first base station and the second base station that are transmitted to the terminal device and/or the time domain location information of the SSB of the to-be-measured neighboring cell, the terminal device can determine the first SMTC window corresponding to the to-be-measured neighboring cell.

Figure 4:
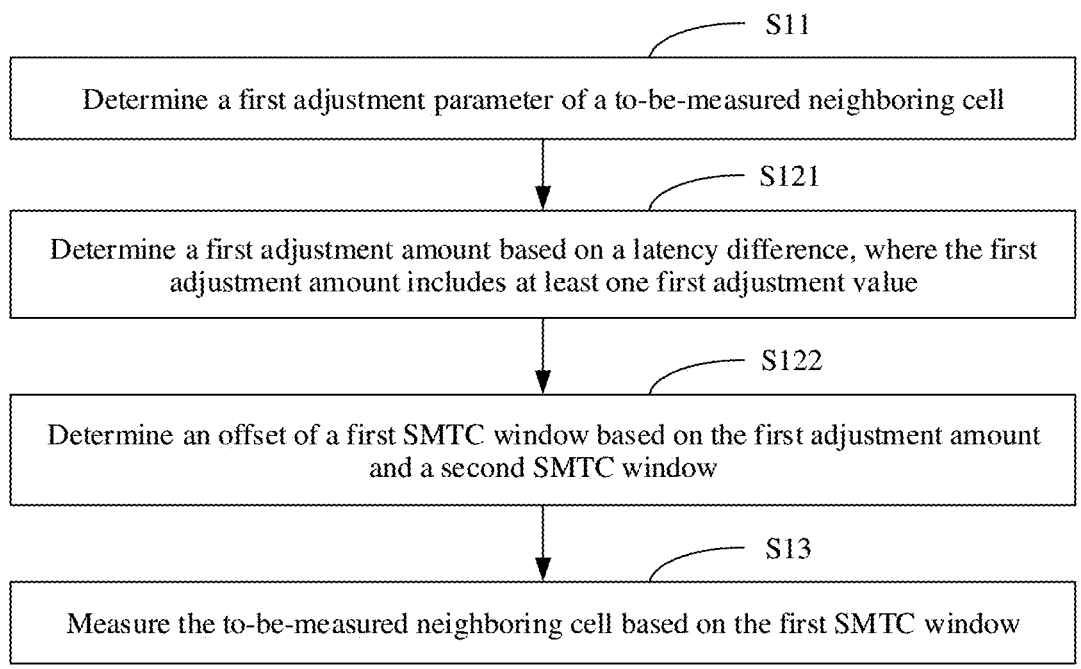
FIG. 4 is a schematic diagram of a working procedure of determining a first SMTC window in a measurement method using a synchronization signal block according to an embodiment of this application.

The terminal device may determine the first SMTC window in a plurality of manners. In a feasible implementation, referring to a schematic diagram of a working procedure in FIG. 4, the first SMTC window is determined by using the following steps.

Step S121: Determine a first adjustment amount based on the latency difference, where the first adjustment amount includes at least one first adjustment value.

The first adjustment amount is an adjustment amount corresponding to an offset.

The first adjustment amount includes at least one first adjustment value, and one first adjustment value is used to indicate one adjustable value of the offset, or is used to indicate one adjustable range of the offset. That is, the first adjustment amount includes at least one adjustable value corresponding to the offset and/or at least one adjustable range corresponding to the offset.

Step S122: Determine an offset of the first SMTC window based on the first adjustment amount and a second SMTC window, where the second SMTC window is configured by the first base station.

The second SMTC window is configured by the first base station. The first base station may generate second SMTC configuration information including a configuration parameter of the second SMTC window (for example, parameters such as a periodicity, duration, and an offset of the second SMTC window), and send the second SMTC configuration information to the terminal device, so that the terminal device determines the second SMTC window. Then, the terminal device adjusts the second SMTC window based on the first adjustment amount, to determine the first SMTC window.

In addition, in a feasible implementation, when the first base station needs to send the first identifier of the to-be-measured neighboring cell to the terminal device, the first base station may further add the first identifier of the to-be-measured neighboring cell to the second SMTC configuration information, so that the terminal device can determine the second SMTC window and the first identifier of the to-be-measured neighboring cell. Alternatively, the second SMTC configuration information and the first identifier of the to-be-measured neighboring cell may be separately sent by using different messages, and the first base station separately sends the different messages to the terminal device. This is not limited in this embodiment of this application.

The first adjustment amount may be determined by using the latency difference. In addition, because the latency difference may be a positive number or a negative number, the first adjustment amount may also be a positive number or a negative number. That is, when the latency difference is a negative number (that is, the first distance is less than the second distance), the first adjustment amount is a negative number, and when the latency difference is a positive number (that is, the first distance is greater than the second distance), the first adjustment amount is a positive number.

In addition, the first adjustment value in the first adjustment amount may be determined in a plurality of manners. In a feasible implementation, the first adjustment value is determined based on the latency difference. In this manner, the at least one first adjustment value included in the first adjustment amount may be the latency difference. For example, when the latency difference between the first base station and the second base station is 1 ms, the at least one first adjustment value included in the first adjustment amount is determined to be 1 ms. In this case, the offset of the second SMTC window may be adjusted by 1 ms, and an adjusted offset is the offset of the first SMTC window. Alternatively, the first adjustment value may be a time range, and the time range may be determined in a plurality of manners. For example, in an example, an absolute value of a minimum time value in the time range is not less than an absolute value of the latency difference.

In another feasible implementation, the at least one first adjustment value included in the first adjustment amount may be an adjustment value corresponding to a latency difference range in which the latency difference is located. In this case, the terminal device pre-stores correspondences between different latency difference ranges and first adjustment values. When a latency difference included in a latency difference range is a positive number, a corresponding first adjustment value is a positive number. When a latency difference included in a latency difference range is a negative number, a corresponding first adjustment value is a negative number. After determining the latency difference, the terminal device determines the first adjustment value based on the latency difference range in which the latency difference is located and the correspondences. For example, when it is determined that the latency difference between the first base station and the second base station is 0.5 ms, the first adjustment value is determined to be 1 ms when a first adjustment value corresponding to a latency difference range of 0.2 ms to 1.2 ms in the correspondences is set to 1 ms.

Certainly, the first adjustment amount may alternatively be determined in another manner. This is not limited in this embodiment of this application.

When the offset of the first SMTC window is determined based on the first adjustment amount and the second SMTC window, the offset of the second SMTC window is generally adjusted based on the first adjustment amount, and the second SMTC window whose offset is adjusted is the first SMTC window. That is, the offset of the first SMTC window is an offset obtained after the offset of the second SMTC window is adjusted based on the first adjustment amount. A periodicity of the first SMTC window is the same as the periodicity of the second SMTC window, and duration of the first SMTC window is the same as the duration of the second SMTC window.

In addition, when the offset of the second SMTC window is adjusted based on the first adjustment amount, if the first distance between the first base station and the terminal device is less than the second distance between the second base station and the terminal device, the terminal device backward adjusts the second SMTC window in a time domain location, where an adjustment amount is an absolute value of any first adjustment value in the first adjustment amount, and an adjusted second SMTC window is the first SMTC window corresponding to the to-be-measured neighboring cell.

When the first distance between the first base station and the terminal device is greater than the second distance between the second base station and the terminal device, the terminal device forward adjusts the second SMTC window in a time domain location, where an adjustment amount is an absolute value of any first adjustment value in the first adjustment amount, and an adjusted second SMTC window is the first SMTC window corresponding to the to-be-measured neighboring cell.

In an actual application scenario, the first distance between the first base station and the terminal device may be greater than or less than the second distance between the second base station and the terminal device. For example, referring to a schematic diagram of an application scenario shown in FIG. 5, three satellites are included in FIG. 5, where a satellite S1 is a base station (that is, a first base station) corresponding to a serving cell, and both satellites S2 and S3 are base stations (that is, second base stations) corresponding to to-be-measured cells. A first distance between S1 and a terminal device is less than a second distance between S2 and the terminal device, and the first distance between S1 and the terminal device is greater than a second distance between S3 and the terminal device.

When the first distance between the first base station and the terminal device is less than the second distance between the second base station and the terminal device, relative to an SSB of the first base station, an SSB of the second base station arrives at the terminal device at a later time. In this case, measurement of the SSB of the to-be-measured neighboring cell needs to be started at a later moment. Therefore, the SMTC window needs to be backward adjusted in a time domain location. If the first SMTC window determined by using the foregoing steps is after the second SMTC window in a time domain location, when the to-be-measured neighboring cell is measured by using the first SMTC window, the terminal device starts measurement of the SSB of the to-be-measured neighboring cell at a later moment, so that the SSB of the to-be-measured neighboring cell is not missed.

Figure 5:
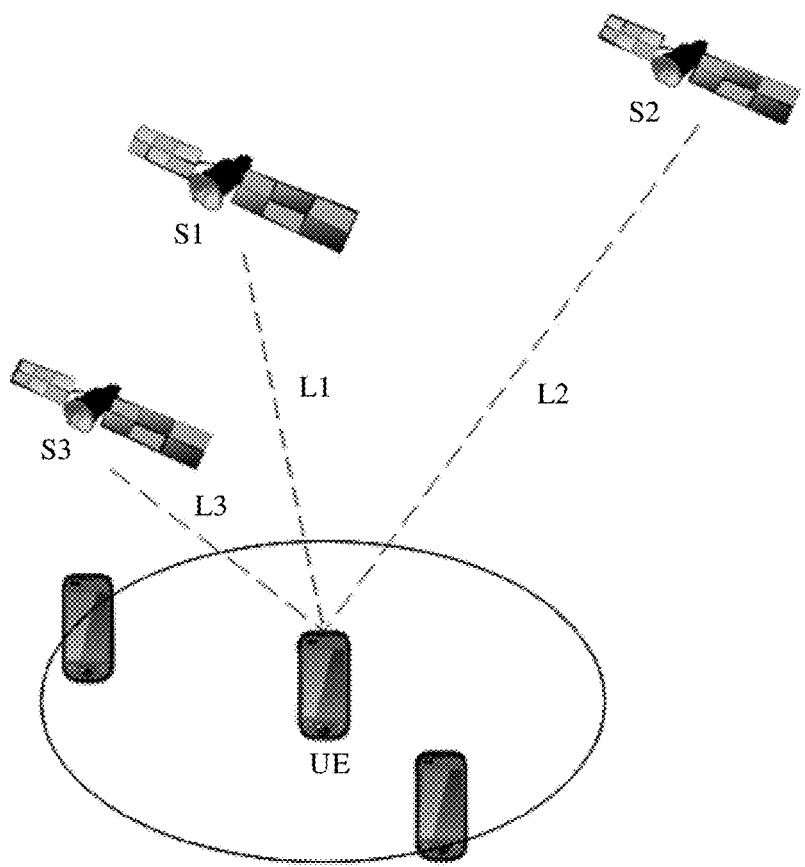
FIG. 5 is a schematic diagram of an application scenario of a non-terrestrial network used in this application.

For example, in the application scenario shown in FIG. 5, when the second base station is S2 and the first base station is S1, a first SMTC window corresponding to S2 needs to be backward adjusted.

Figure 6A:
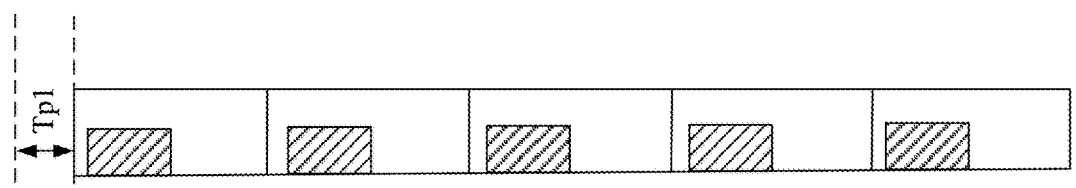
FIG. 6(a) to FIG. 6(c) are a schematic diagram of an application effect of an SMTC window according to an embodiment of this application.
Figure 6B:
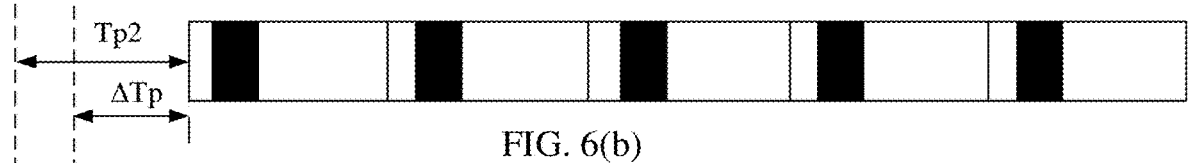
Figure 6C:
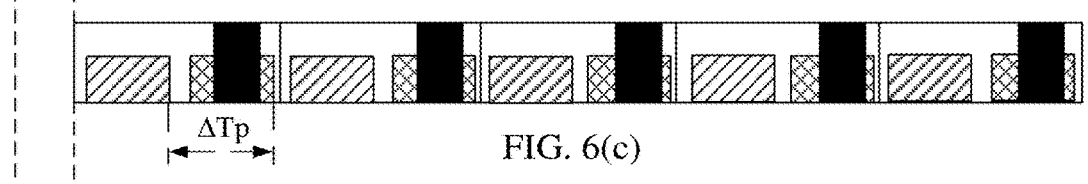

In addition, to clarify an effect obtained by this application, this embodiment of this application discloses a schematic diagram shown in FIG. 6(a) to FIG. 6(c). An application scenario of FIG. 6(a) to FIG. 6(c) is shown in FIG. 1. That is, a satellite S1 is a base station (that is, a first base station) corresponding to a serving cell, a satellite S2 is a base station (that is, a second base station) corresponding to a to-be-measured neighboring cell, and a second distance is greater than a first distance.

In FIG. 6(a), an unshaded rectangular box represents a downlink signal that is transmitted by the first base station and that arrives at a terminal device after a latency of a time Tp1, and a rectangular box filled with slashes represents a second SMTC window configured by the first base station.

FIG. 6(b) shows a downlink signal (that is, an unshaded rectangular box) sent by the second base station, and the downlink signal includes an SSB (that is, a solid rectangular box) of the to-be-measured neighboring cell.

FIG. 6(c) shows a downlink signal of the to-be-measured neighboring cell that arrives at the terminal device after a latency of a time Tp2, and a second SMTC window and a first SMTC window are separately marked in FIG. 6(c). A rectangular box filled with slashes of a same slope represents the second SMTC window configured by the first base station, and a rectangular box filled with slashes of different slopes represents the first SMTC window determined by the terminal device for the to-be-measured neighboring cell. Because the second SMTC window is configured by the first base station, a time domain location of the second SMTC window is the same as a time domain location of the SMTC window in FIG. 6(a). A solid rectangular box represents the SSB of the to-be-measured neighboring cell. Based on FIG. 6(c), it may be determined that if the terminal device measures the to-be-measured neighboring cell by using the second SMTC window, the SSB of the to-be-measured neighboring cell is missed. In this case, the first SMTC window may be determined for the to-be-measured neighboring cell by using the method in this embodiment of this application.

In the example shown in FIG. 6(c), an offset of the first SMTC window is determined based on the foregoing step by adjusting an offset of the second SMTC window. Specifically, the second SMTC window is backward adjusted in a time domain location, that is, the first SMTC window is after the second SMTC window in a time domain location. In this case, a time domain location of the first SMTC window covers a time domain location at which the SSB of the to-be-measured neighboring cell arrives at the terminal device, so that the SSB of the to-be-measured neighboring cell can be measured by using the first SMTC window, and the SSB of the to-be-measured neighboring cell is not missed.

When the first distance between the first base station and the terminal device is greater than the second distance between the second base station and the terminal device, it indicates that relative to an SSB of the first base station, an SSB of the second base station arrives at the terminal device at an earlier time. In this case, measurement of the SSB of the to-be-measured neighboring cell needs to be started at an earlier moment. Therefore, the SMTC window needs to be forward adjusted. The offset of the first SMTC window is determined based on the foregoing step by adjusting the offset of the second SMTC window. Specifically, the second SMTC window is forward adjusted in a time domain location, that is, the first SMTC window is before the second SMTC window in a time domain location. Therefore, when the to-be-measured neighboring cell is measured by using the first SMTC window, the terminal device starts measurement of the SSB of the to-be-measured neighboring cell at an earlier moment, so that the SSB of the to-be-measured neighboring cell is not missed.

For example, in the application scenario shown in FIG. 5, when the second base station is S3 and the first base station is S1, because the first distance between the first base station and the terminal device is greater than the second distance between the second base station and the terminal device, a location of a first SMTC window corresponding to S3 needs to be forward adjusted.

According to the foregoing method, the offset of the second SMTC window can be adjusted, and the offset of the first SMTC window corresponding to the to-be-measured neighboring cell is determined based on the adjusted offset, so that the first SMTC window may be before or after the second SMTC window in a time domain location.

In the foregoing steps, the first SMTC window is determined by adjusting the offset. In addition, in this embodiment of this application, the first SMTC window may alternatively be determined by adjusting the duration of the second SMTC window. In this case, when the first SMTC window is determined, the following steps may be used, including first determining a second adjustment amount based on the latency difference, where the second adjustment amount includes at least one second adjustment value, and then determining duration of the first SMTC window based on the second adjustment amount and the second SMTC window, where the second SMTC window is configured by the first base station.

One second adjustment value is used to indicate one adjustable value of the duration, or is used to indicate one adjustable range of the duration.

The second SMTC window is configured by the first base station. In this case, the first base station may generate second SMTC configuration information including a configuration parameter of the second SMTC window (for example, parameters such as a periodicity, duration, and an offset of the second SMTC window), and send the second SMTC configuration information to the terminal device, so that the terminal device obtains the second SMTC window. Then, the terminal device adjusts the second SMTC window based on the second adjustment amount, to determine the first SMTC window.

In this embodiment of this application, the first SMTC window is determined by using the second adjustment amount, and the second adjustment amount corresponds to duration of an SMTC window. That is, in this embodiment of this application, the first SMTC window is determined by adjusting the duration of the second SMTC window.

That is, the solution of step S121 to step S122 and the foregoing solution are used to determine the first SMTC window by respectively adjusting the offset of the second SMTC window and the duration of the second SMTC window. The second SMTC windows in the two solutions are both configured by the first base station. That is, when determining that the second SMTC window configured by the first base station is invalid for the to-be-measured neighboring cell, the terminal device may determine the first SMTC window by adjusting the second SMTC window. The second SMTC windows in the two solutions may be a same SMTC window, or may be different SMTC windows.

The second adjustment value may be determined in a plurality of manners. In a feasible implementation, the second adjustment value is determined by using a latency difference. In this case, the at least one second adjustment value included in the second adjustment amount may be the latency difference. For example, when it is determined that the latency difference between the first base station and the second base station is 1 ms, the second adjustment value is determined to be 1 ms. In this case, the offset of the second SMTC window may be adjusted by 1 ms. Alternatively, the second adjustment value may be a time range, and an absolute value of a minimum time value in the time range is not less than an absolute value of the latency difference.

In another feasible implementation, the at least one second adjustment value included in the second adjustment amount may be an adjustment value corresponding to a latency difference range in which the latency difference is located. In this case, the terminal device pre-stores correspondences between different latency difference ranges and second adjustment values. After determining the latency difference, the terminal device determines the second adjustment value based on the latency difference range in which the latency difference is located and the correspondences.

Certainly, the second adjustment amount may alternatively be determined in another manner. This is not limited in this embodiment of this application.

When the duration of the first SMTC window is determined based on the second adjustment amount and the second SMTC window, the duration of the second SMTC window is generally adjusted based on the second adjustment amount, and the second SMTC window whose duration is adjusted is the first SMTC window. That is, the duration of the first SMTC window is duration obtained after the duration of the second SMTC window is adjusted based on the second adjustment amount. A periodicity of the first SMTC window is the same as the periodicity of the second SMTC window, and an offset of the first SMTC window is determined based on an adjustment amount of the offset of the second SMTC window.

Specifically, that the duration of the second SMTC window is adjusted by using the second adjustment amount generally means that the duration of the second SMTC window is increased, and an increase amount of the duration is an absolute value of an adjustment value in the second adjustment amount.

When the first distance between the first base station and the terminal device is less than the second distance between the second base station and the terminal device, an added duration part is located after the duration of the second SMTC window configured by the first base station. In this case, the offset of the first SMTC window is the same as the offset of the second SMTC window.

When the first distance between the first base station and the terminal device is greater than the second distance between the second base station and the terminal device, an added duration part is located before the duration of the second SMTC window configured by the first base station. In this case, the offset of the first SMTC window is less than the offset of the second SMTC window.

To clarify an effect obtained by this embodiment of this application, this embodiment of this application discloses a schematic diagram shown in FIG. 7(a) to FIG. 7(c). An application scenario of FIG. 7(a) to FIG. 7(c) is shown in FIG. 1. That is, a satellite S1 is a base station (that is, a first base station) corresponding to a serving cell, a satellite S2 is a base station (that is, a second base station) corresponding to a to-be-measured neighboring cell, and a second distance is greater than a first distance.

In FIG. 7(a), an unshaded rectangular box represents a downlink signal that is transmitted by the first base station and that arrives at a terminal device after a latency of a time Tp1, and a rectangular box filled with slashes represents a second SMTC window configured by the first base station.

FIG. 7(b) shows a downlink signal (that is, an unshaded rectangular box) sent by the second base station, and the downlink signal includes an SSB (that is, a solid rectangular box) of the to-be-measured neighboring cell.

FIG. 7(c) shows a downlink signal of the to-be-measured neighboring cell that arrives at the terminal device after a latency of a time Tp2, and duration is increased based on the second SMTC window, where an increase of the duration is a second adjustment value. In FIG. 7(c), a rectangular box filled with slashes of a same slope represents the second SMTC window configured by the first base station, and a rectangular box filled with slashes of different slopes represents an added duration part. Duration of the second SMTC window and added duration jointly form duration of a first SMTC window. That is, in FIG. 7(c), the first SMTC window includes the rectangular box filled with slashes of a same slope and the rectangular box filled with slashes of different slopes. Because the first distance is less than the second distance, the added duration is located after the duration of the second SMTC window. A solid rectangular box represents the SSB of the to-be-measured neighboring cell.

Based on FIG. 7(c), it may be determined that if the terminal device measures the to-be-measured neighboring cell by using the second SMTC window, the SSB of the to-be-measured neighboring cell is missed. In this case, the first SMTC window may be determined for the to-be-measured neighboring cell by using the method in this embodiment of this application, and the to-be-measured neighboring cell may be measured by using the first SMTC window, to avoid missing the SSB of the to-be-measured neighboring cell.

When the first distance between the first base station and the terminal device is less than the second distance between the second base station and the terminal device, relative to an SSB of the first base station, an SSB of the second base station arrives at the terminal device at a later time. In this case, measurement of the SSB of the to-be-measured neighboring cell needs to be started at a later moment, so that the SSB of the to-be-measured neighboring cell can be measured. Therefore, the added duration part is located after the second SMTC window configured by the first base station.

When the first distance between the first base station and the terminal device is greater than the second distance between the second base station and the terminal device, relative to an SSB of the first base station, an SSB of the second base station arrives at the terminal device at an earlier time. In this case, measurement of the SSB of the to-be-measured neighboring cell needs to be started at an earlier moment, so that the SSB of the to-be-measured neighboring cell can be measured. Therefore, the added duration part is located before the second SMTC window configured by the first base station.

In the foregoing embodiment, solutions of obtaining the first SMTC window by adjusting the offset of the second SMTC window or adjusting the duration of the second SMTC window are separately disclosed. In addition, the offset and the duration of the second SMTC window may be simultaneously adjusted. In this case, the offset and the duration of the first SMTC window are determined based on a specific adjustment manner of the second SMTC window, and the periodicity of the first SMTC window is the same as the periodicity of the second SMTC window.

In addition, the terminal device may alternatively determine the first SMTC window of the to-be-measured neighboring cell based on the time domain location information of the SSB of the to-be-measured neighboring cell. In this case, the terminal device may perform the following steps, including respectively determining a periodicity and duration of the first SMTC window based on a periodicity and duration of a second SMTC window, where the second SMTC window is configured by the first base station, and determining an offset of the first SMTC window based on a time domain location of the SSB of the to-be-measured neighboring cell.

In this embodiment of this application, the periodicity of the first SMTC window may be the same as the periodicity of the second SMTC window, and the duration of the first SMTC window may be the same as the duration of the second SMTC window. In addition, the offset of the first SMTC window is determined based on the time domain location of the SSB of the to-be-measured neighboring cell and the duration of the first SMTC window. To avoid missing the SSB of the to-be-measured neighboring cell, a time domain location of the first SMTC window can cover a time domain location at which the SSB of the to-be-measured neighboring cell arrives at the terminal device.

Further, after the first SMTC window corresponding to the to-be-measured neighboring cell is determined by using the foregoing embodiment, the first distance and the second distance may also change. For example, the terminal device may move, causing a location of the terminal device to change, and further causing the first distance between the first base station and the terminal device and the second distance between the second base station and the terminal device to change. Accordingly, a latency difference between a transmission latency that is between the first base station and the terminal device and a transmission latency that is between the second base station and the terminal device also changes. In this case, the first SMTC window determined in step S12 may no longer be applicable to the to-be-measured neighboring cell. For another example, a satellite on which a base station function or an antenna function is deployed may also move. Accordingly, the first SMTC window determined in step S12 may no longer be applicable to the to-be-measured cell.

Therefore, in this embodiment of this application, the operations may further include determining a second adjustment parameter of the to-be-measured neighboring cell, and determining, based on the second adjustment parameter, a third SMTC window corresponding to the to-be-measured neighboring cell, and measuring the to-be-measured neighboring cell by using the third SMTC window.

For example, the terminal device may measure, in a first time segment, the to-be-measured neighboring cell by using the first SMTC window, and determine the second adjustment parameter of the to-be-measured neighboring cell when the SSB of the to-be-measured neighboring cell always cannot be measured.

If the terminal device measures, in the first time segment, the to-be-measured neighboring cell by using the first SMTC window, but the SSB of the to-be-measured neighboring cell always cannot be measured, it indicates that the first SMTC window is no longer applicable to the to-be-measured neighboring cell. In this case, the terminal device may determine the second adjustment parameter of the to-be-measured neighboring cell, and determine, based on the second adjustment parameter, the third SMTC window corresponding to the to-be-measured neighboring cell, to avoid missing the SSB of the to-be-measured neighboring cell.

The second adjustment parameter includes a latency difference between signals of the first base station and the second base station that are transmitted to the terminal device, and/or time domain location information of the SSB of the to-be-measured neighboring cell at a current moment. In addition, a specific operation of determining, by using the second adjustment parameter, the third SMTC window corresponding to the to-be-measured neighboring cell is the same as the foregoing specific operation of determining the first SMTC window, and the two operations may be mutually referenced. Details are not described herein.

Further, in this embodiment of this application, before the first adjustment parameter of the to-be-measured neighboring cell is determined, the method further includes at least one of the following steps, including determining, based on first indication information from the first base station, that the second SMTC window is invalid, where the second SMTC window is configured by the first base station, and determining the location information of the second base station based on the first identifier of the to-be-measured neighboring cell, and determining, based on the location information of the second base station, that a distance difference between a first distance and a second distance is greater than a first threshold, where the first base station is the base station of the serving cell, the second base station is the base station corresponding to the to-be-measured neighboring cell, the first distance is a distance at which a signal of the first base station is transmitted to the terminal device, and the second distance is a distance at which a signal of the second base station is transmitted to the terminal device.

In this embodiment of this application, that the second SMTC window is invalid means that the second SMTC window is not applicable to measurement of the to-be-measured neighboring cell. If the to-be-measured neighboring cell is measured by using the second SMTC window, the SSB of the to-be-measured neighboring cell is missed.

In this embodiment of this application, it is generally considered that when the difference between the first distance and the second distance is relatively large, it indicates that there is a relatively large latency difference between a transmission latency of the first base station and a transmission latency of the second base station. In this case, it may be determined that the SMTC window configured by the first base station is not applicable to the to-be-measured neighboring cell, and a corresponding SMTC window needs to be determined for the to-be-measured neighboring cell again. Therefore, the first adjustment parameter of the to-be-measured neighboring cell needs to be determined, so that the first adjustment parameter is used to determine the first SMTC window of the to-be-measured neighboring cell.

In addition, the terminal device can further receive the first indication information from the base station. In this case, the first base station obtains the location information of the second base station, and the first base station calculates the difference between the first distance and the second distance. When the difference between the first distance and the second distance is greater than a second threshold, the first base station may generate the first indication information, and the first indication information is used to indicate that the second SMTC window is invalid.

In a feasible implementation, the first indication information may be included in the second SMTC configuration information of the second SMTC window. In this case, when determining that the second SMTC window is invalid for the to-be-measured neighboring cell, the first base station may add a first character to a first field of the second SMTC configuration information. When determining that the first field includes the first character, the terminal device determines that the second SMTC window is invalid.

In addition, when determining that the second SMTC window is valid for the to-be-measured neighboring cell, the first base station may add a second character to the first field of the second SMTC configuration information, or does not add an additional character to the first field of the second SMTC configuration information. When determining that the first field includes the second character or determining that the first field does not include an additional character, the terminal device determines that the second SMTC window is valid.

In another feasible implementation, the second SMTC configuration information and the first indication information may alternatively be two different pieces of information. This is not limited in this embodiment of this application.

Correspondingly, another embodiment of this application further discloses a measurement method using a synchronization signal block. The method is applicable to a first base station, and the first base station is a base station of a serving cell in which a terminal device is located. Referring to a schematic diagram of a working procedure shown in FIG. 8, the method includes the following steps.

Step S21: Determine second indication information, where the second indication information is used to indicate that a fourth SMTC window is invalid for measuring a to-be-measured neighboring cell.

The fourth SMTC window is an SMTC window preconfigured by the first base station for the to-be-measured neighboring cell. When determining that the fourth SMTC window is invalid for the to-be-measured neighboring cell, the first base station may generate the second indication information.

In addition, that the fourth SMTC window is invalid for measuring the to-be-measured neighboring cell means that the fourth SMTC window is not applicable to measurement of the to-be-measured neighboring cell. If the to-be-measured neighboring cell is measured by using the fourth SMTC window, an SSB of the to-be-measured neighboring cell is missed.

Step S22: Send the second indication information to the terminal device.

After receiving the second indication information, the terminal device may determine that the fourth SMTC window configured by the first base station is invalid for the to-be-measured neighboring cell. Therefore, the terminal device no longer uses the fourth SMTC window to measure the to-be-measured neighboring cell, but determines, based on a first adjustment parameter, a first SMTC window applicable to the to-be-measured neighboring cell, and uses the first SMTC window to measure the to-be-measured neighboring cell.

In a feasible implementation, the second indication information may be included in fourth SMTC configuration information corresponding to the fourth SMTC window, and the fourth SMTC configuration information includes a configuration parameter corresponding to the fourth SMTC window. In this case, when determining that the fourth SMTC window is invalid for the to-be-measured neighboring cell, the first base station may add a first character to a first field of the fourth SMTC configuration information. When determining that the first field includes the first character, the terminal device determines that the fourth SMTC window is invalid.

Alternatively, in another feasible manner, the fourth SMTC configuration information and the second indication information may alternatively be two different pieces of information. This is not limited in this embodiment of this application.

In addition, when there are a plurality of to-be-measured neighboring cells, the second indication information may further include an identifier of a first target to-be-measured neighboring cell. The first target to-be-measured neighboring cell is a to-be-measured neighboring cell that is in the plurality of to-be-measured neighboring cells and to which the fourth SMTC window is not applicable.

The identifier of the first target to-be-measured neighboring cell may be an ID of the first target to-be-measured neighboring cell, or another parameter that can distinguish the first target to-be-measured neighboring cell. After receiving the identifier of the first target to-be-measured neighboring cell, the terminal device may determine the to-be-measured neighboring cell to which the fourth SMTC window is not applicable, and determine a first SMTC window for the to-be-measured neighboring cell to which the fourth SMTC window is not applicable.

In this embodiment of this application, when determining that the fourth SMTC window is invalid for measuring the to-be-measured neighboring cell, the first base station may generate corresponding second indication information, and send the second indication information to the terminal device. After receiving the second indication information, the terminal device may determine, based on the second indication information, that the fourth SMTC window is invalid for the to-be-measured neighboring cell. In this case, the terminal device determines the first SMTC window corresponding to the to-be-measured neighboring cell, and measures the to-be-measured neighboring cell by using the first SMTC window, thereby avoiding a problem that the terminal device misses the SSB of the to-be-measured neighboring cell when measuring the to-be-measured neighboring cell by using the SMTC window that is not applicable to the to-be-measured neighboring cell.

In step S11, the first base station may determine the second indication information, and indicate, by using the second indication information, that a third SMTC window is invalid for measuring the to-be-measured neighboring cell.

Figure 9:
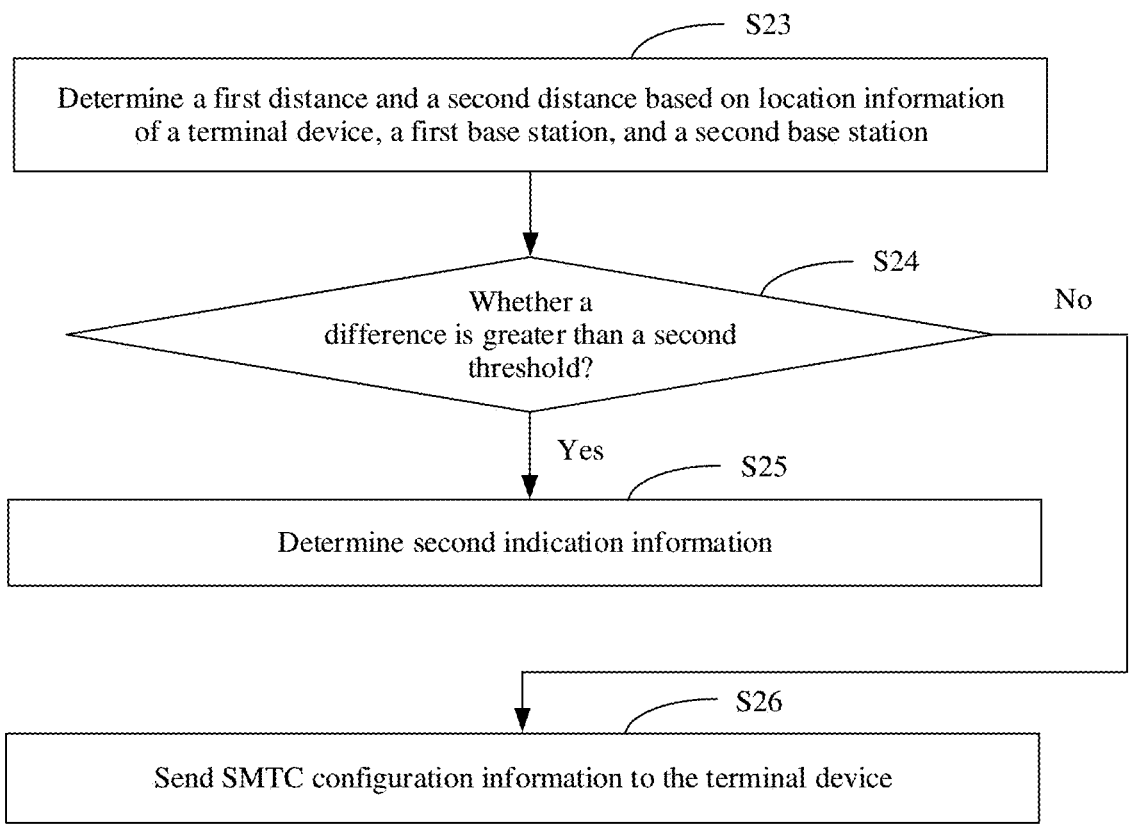
FIG. 9 is a schematic diagram of a working procedure of another measurement method using a synchronization signal block according to an embodiment of this application.

The first base station may determine, based on transmission distances corresponding to the terminal device that are respectively of the first base station and a second base station, whether the fourth SMTC window is invalid for measuring the to-be-measured neighboring cell. In this case, referring to a schematic diagram of a working procedure shown in FIG. 9, this embodiment of this application further includes the following steps.

Step S23: Determine a first distance and a second distance based on location information of the terminal device, the first base station, and a second base station, where the second base station is a base station corresponding to the to-be-measured neighboring cell, the first distance is a distance at which a signal of the first base station is transmitted to the terminal device, and the second distance is a distance at which a signal of the second base station is transmitted to the terminal device.

The location information of the terminal device may be reported by the terminal device to the first base station. Then, the first base station determines the first distance and the second distance based on the location information reported by the terminal device.

Step S24: Compare a difference between the first distance and the second distance with a second threshold, to determine whether the difference is greater than the second threshold, and if yes, perform an operation of step S25.

Step S25: Determine second indication information, where the second indication information is used to indicate that the fourth SMTC window is invalid for measuring the to-be-measured neighboring cell, and send the second indication information to the terminal device.

The second threshold is a preconfigured threshold corresponding to a distance, and the second threshold may be the same as the first threshold, or may be different from the first threshold.

In this embodiment of this application, if the difference between the first distance and the second distance is greater than the second threshold, it indicates that the difference between the first distance and the second distance is relatively large, and the fourth SMTC window preconfigured by the first base station is usually not applicable to the to-be-measured neighboring cell. In this case, to prevent the terminal device from performing measurement by using the fourth SMTC window, the first base station generates the second indication information, and transmits the second indication information to the terminal device.

Further, if it is determined that the difference is not greater than the second threshold in step S24, the following step may be further performed.

Step S26: Send SMTC configuration information to the terminal device, where the SMTC configuration information includes a configuration parameter corresponding to the fourth SMTC window.

In this case, after receiving the SMTC configuration information, the terminal device determines the corresponding fourth SMTC window based on the configuration parameter included in the SMTC configuration information, and measures the to-be-measured neighboring cell by using the fourth SMTC window.

In addition, when there are a plurality of to-be-measured neighboring cells, and the fourth SMTC window is not applicable to some of the to-be-measured neighboring cells, and is applicable to the others of the to-be-measured neighboring cells, the first base station may determine two types of SMTC configuration information. A to-be-measured neighboring cell to which the fourth SMTC window is not applicable is a first target to-be-measured neighboring cell, and a to-be-measured neighboring cell to which the fourth SMTC window is applicable is a second target to-be-measured neighboring cell. The two types of SMTC configuration information generated by the first base station are respectively first SMTC configuration information and second SMTC configuration information. The first SMTC configuration information includes the second indication information and an identifier of the first target to-be-measured neighboring cell, and the second SMTC configuration information includes an identifier of the second target to-be-measured neighboring cell, and does not include the second indication information.

Correspondingly, another embodiment of this application discloses a measurement method using a synchronization signal block. The method is applicable to a first base station, the first base station is a base station of a serving cell in which a terminal device is located, and the method includes the following steps, including determining a second identifier of a to-be-measured neighboring cell, where the to-be-measured neighboring cell is a cell to be measured by the terminal device by using a synchronization signal block, and sending the second identifier of the to-be-measured neighboring cell to the terminal device.

The second identifier of the to-be-measured neighboring cell may be an identifier ID of the to-be-measured neighboring cell, or may be another parameter of the to-be-measured neighboring cell. When a base station function of the to-be-measured neighboring cell is deployed on a satellite, the first identifier of the to-be-measured neighboring cell may alternatively be an ID of a satellite corresponding to the to-be-measured neighboring cell. This is not limited in this embodiment of this application.

The second identifier of the to-be-measured neighboring cell is used to implement positioning of a second base station. After receiving the second identifier of the to-be-measured neighboring cell, the terminal device may determine location information of the second base station by querying a correspondence between the second identifier of the to-be-measured neighboring cell and the location information of the second base station. Then, the terminal device determines, based on location information of the terminal device and location information of the first base station and the second base station, a latency difference between signals of the first base station and the second base station that are transmitted to the terminal device. When the terminal device determines that the latency difference is relatively large, the terminal device determines an SMTC window corresponding to the to-be-measured neighboring cell, and measures the to-be-measured neighboring cell by using the SMTC window determined by the terminal device.

This application discloses, by using the foregoing embodiments, the measurement methods using a synchronization signal block that are respectively applicable to a terminal device and a first base station. The terminal device may determine, based on a first adjustment parameter of a to-be-measured neighboring cell, a first SMTC window corresponding to the to-be-measured neighboring cell, and then measure the to-be-measured neighboring cell based on the first SMTC window. The first base station may determine second indication information, and send the second indication information to a terminal device, to use the second indication information to indicate that a third SMTC window is invalid for a to-be-measured neighboring cell. Alternatively, the first base station may send a first identifier of the to-be-measured neighboring cell to the terminal device, so that the terminal device determines a location relationship of a second base station based on the first identifier.

To clarify operations of the terminal device and the first base station, the following discloses two examples by using schematic diagrams of information exchange. The two examples are used to describe operations that can be performed by the terminal device and the first base station.

Figure 10:
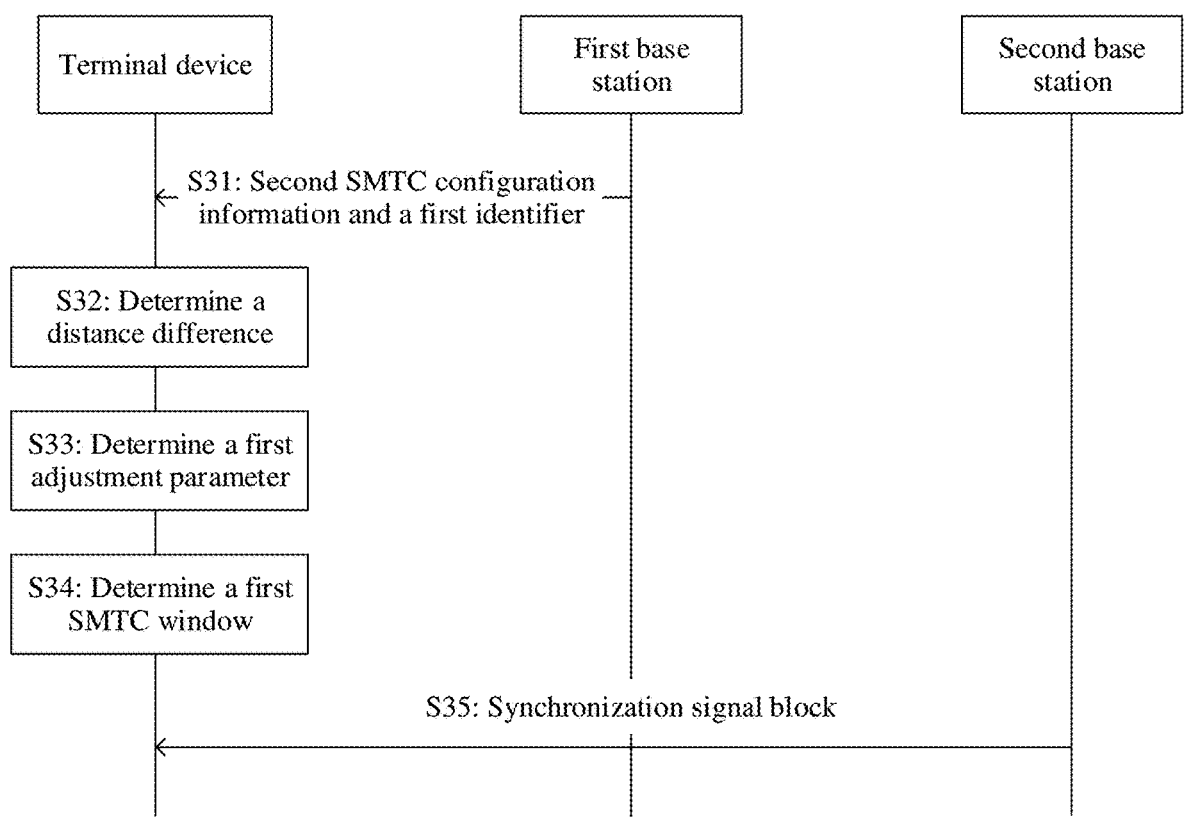
FIG. 10 is a schematic diagram of information exchange in a measurement method using a synchronization signal block according to an embodiment of this application.

Referring to a schematic diagram of information exchange shown in FIG. 10, in a first example, an information exchange process between the terminal device and the first base station includes the following steps.

Step S31: The first base station sends second SMTC configuration information including a configuration parameter of a second SMTC window to the terminal device, and sends a first identifier of a to-be-measured neighboring cell to the terminal device.

The first identifier may be included in the second SMTC configuration information, or the second SMTC configuration information and the first identifier are sent by using two different messages.

Step S32: The terminal device determines location information of a second base station based on the first identifier of the to-be-measured neighboring cell, and determines, based on the location information of the second base station, whether a distance difference between a first distance and a second distance is greater than a first threshold.

Step S33: When the distance difference between the first distance and the second distance is greater than the first threshold, the terminal device determines a first adjustment parameter of the to-be-measured neighboring cell.

The first adjustment parameter of the to-be-measured neighboring cell includes a latency difference between signals of the first base station and the second base station that are transmitted to the terminal device, and/or time domain location information of an SSB of the to-be-measured neighboring cell.

Step S34: The terminal device determines, based on the first adjustment parameter, a first synchronization signal block-based measurement timing configuration SMTC window corresponding to the to-be-measured neighboring cell.

For a manner in which the terminal device determines the first SMTC window based on the first adjustment parameter, refer to the foregoing embodiment. Details are not described herein.

Step S35: The terminal device measures the to-be-measured neighboring cell based on the first SMTC window.

In the foregoing example, the first base station sends the second SMTC configuration information including the second SMTC window to the terminal device, and sends the first identifier of the to-be-measured neighboring cell to the terminal device. The terminal device determines the location information of the second base station based on the first identifier, and further determines whether the distance difference between the first distance and the second distance is greater than the first threshold. If yes, it indicates that the second SMTC window included in the second SMTC configuration information is invalid for the to-be-measured neighboring cell. The terminal device then determines the first SMTC window based on the first adjustment parameter, and measures the to-be-measured neighboring cell by using the first SMTC window.

Figure 11:
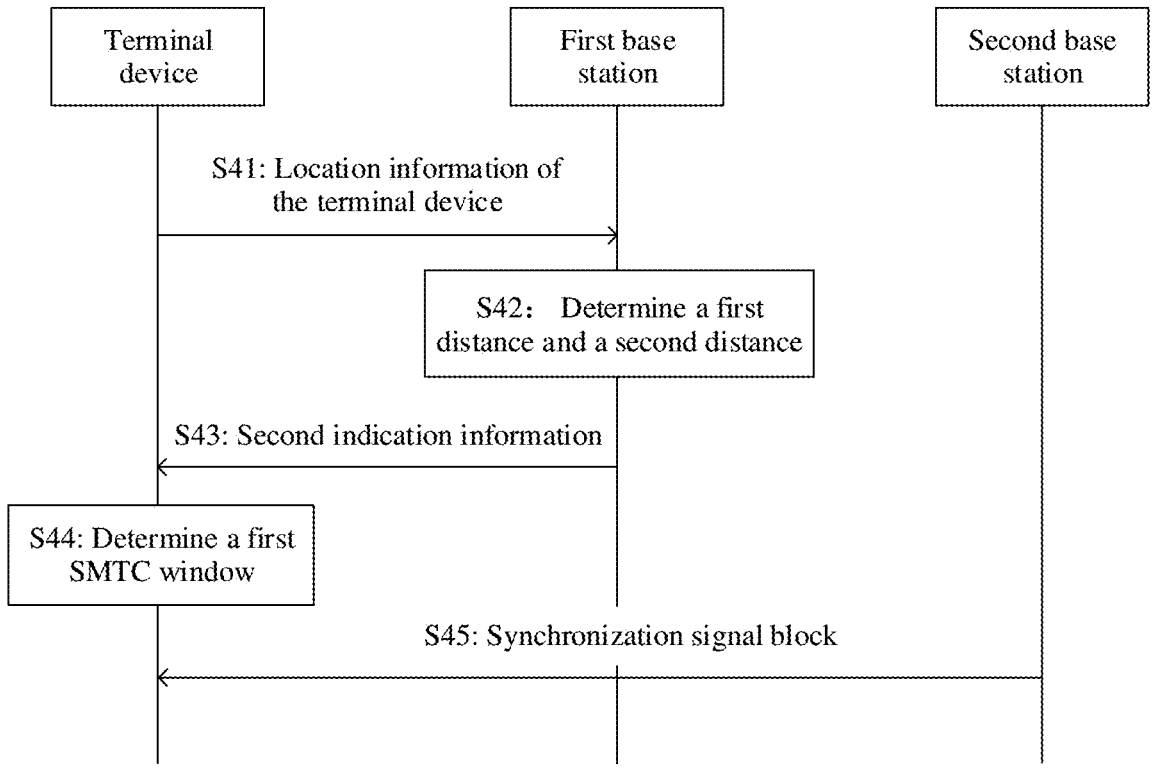
FIG. 11 is another schematic diagram of information exchange in a measurement method using a synchronization signal block according to an embodiment of this application.

Referring to a schematic diagram of information exchange shown in FIG. 11, in another example, an information exchange process between the terminal device and the first base station includes the following steps.

Step S41: The terminal device reports location information of the terminal device to the first base station.

Step S42: The first base station determines a first distance and a second distance based on location information of the terminal device, the first base station, and a second base station.

The second base station is a base station corresponding to a to-be-measured neighboring cell, the first distance is a distance at which a signal of the first base station is transmitted to the terminal device, and the second distance is a distance at which a signal of the second base station is transmitted to the terminal device.

Step S43: When a difference between the first distance and the second distance is greater than a second threshold, the first base station determines a second indication information, and sends the second indication information to the terminal device.

The second indication information is used to indicate that a third SMTC window is invalid for measuring the to-be-measured neighboring cell.

Step S44: After receiving the second indication information, the terminal device determines, based on a first adjustment parameter, a first synchronization signal block-based measurement timing configuration SMTC window corresponding to the to-be-measured neighboring cell.

For a manner in which the terminal device determines the first SMTC window based on the first adjustment parameter, refer to the foregoing embodiment. Details are not described herein.

Step S45: The terminal device measures the to-be-measured neighboring cell based on the first SMTC window.

In the foregoing example, the terminal device reports the location information of the terminal device to the first base station, and the first base station determines, based on the location information of the terminal device, the first base station, and the second base station, whether the third SMTC window is invalid for measuring the to-be-measured neighboring cell. If the third SMTC window is not applicable to measurement of the to-be-measured neighboring cell, the first base station generates the second indication information, and uses the second indication information to indicate that the third SMTC window included in third SMTC configuration information is invalid for the to-be-measured neighboring cell. After receiving the second indication information, the terminal device determines the first SMTC window based on the first adjustment parameter, and measures the to-be-measured neighboring cell by using the first SMTC window.

According to the foregoing two examples, when the SMTC window configured by the first base station is invalid for the to-be-measured neighboring cell, the terminal device can determine the first SMTC window corresponding to the to-be-measured neighboring cell, and measure the to-be-measured neighboring cell by using the first SMTC window, thereby avoiding missing the SSB of the to-be-measured neighboring cell.

Figure 12:
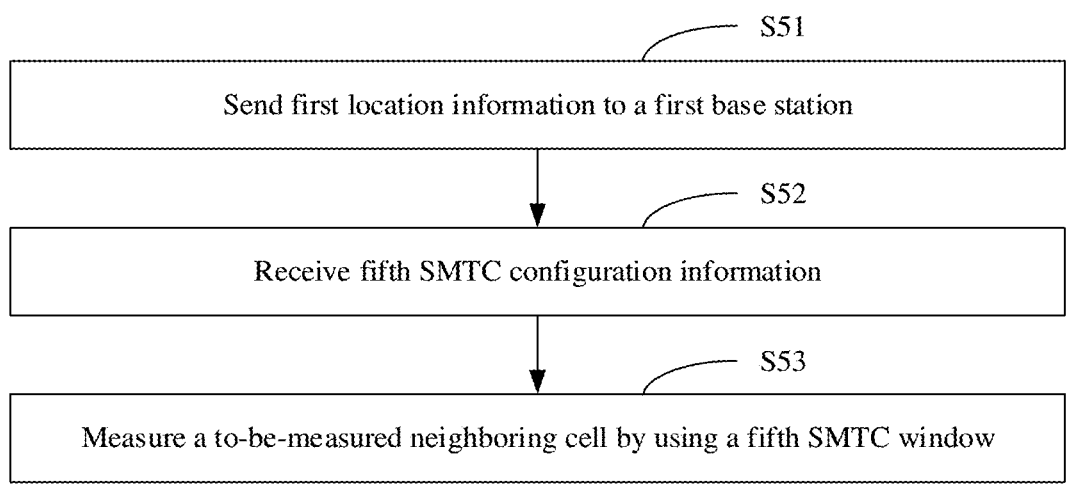
FIG. 12 is a schematic diagram of a working procedure of another measurement method using a synchronization signal block according to an embodiment of this application.

Correspondingly, another embodiment of this application discloses a measurement method using a synchronization signal block. The method is applicable to a terminal device. Referring to a schematic diagram of a working procedure shown in FIG. 12, the method includes the following steps.

Step S51: Send first location information to a first base station, where the first location information is used to indicate a location of the terminal device.

After receiving the first location information, the first base station may determine a transmission latency difference between a first distance and a second distance based on the first location information of the terminal device, the first distance, and the second distance. The first distance is a distance at which a signal of the first base station is transmitted to the terminal device, the second distance is a distance at which a signal of a second base station is transmitted to the terminal device, and the second base station is a base station corresponding to a to-be-measured neighboring cell. Then, the first base station determines, based on the latency difference, an SMTC window used to perform synchronization signal block measurement on the to-be-measured neighboring cell, and then sends fifth SMTC configuration information including a configuration parameter of a fifth SMTC window to the terminal device.

Step S52: Receive the fifth SMTC configuration information.

The fifth SMTC configuration information includes the configuration parameter that is of the fifth SMTC window and that is determined by the first base station based on the first location information, and the fifth SMTC window is used to measure the to-be-measured neighboring cell. The first base station is a base station of a serving cell.

Step S53: Measure the to-be-measured neighboring cell by using the fifth SMTC window.

In this embodiment of this application, the terminal device may send, to the first base station, the first location information used to indicate the location of the terminal device. In this case, the first base station determines, based on the location information of the terminal device, a latency difference between a latency that is between the first base station and the terminal device and a latency that is between the second base station and the terminal device, and configures, for the terminal device by using the latency difference, the fifth SMTC window used to measure the to-be-measured neighboring cell.

According to the solution in this embodiment of this application, the terminal device measures the to-be-measured neighboring cell by using the fifth SMTC window, to avoid missing an SSB of the to-be-measured neighboring cell.

Further, in this embodiment of this application, the method further includes sending first report information to the first base station, where the first report information includes at least one of the following, including location information of the terminal device, SMTC window configuration request information, and neighboring cell SSB detection failure information.

After the terminal device receives the fifth SMTC configuration information, the first distance and the second distance may also change. For example, the terminal device may move, causing the location of the terminal device to change, or a location of a satellite on which a base station function or an antenna function is deployed changes, causing the first distance and the second distance to change, and further causing the latency difference between the latency that is between the first base station and the terminal device and the latency that is between the second base station and the terminal device to change. In this case, the fifth SMTC window may no longer be applicable to the to-be-measured neighboring cell.

To prevent the terminal device from measuring the to-be-measured neighboring cell by using an SMTC window that is not applicable to the to-be-measured neighboring cell, the terminal device may periodically report the location information of the terminal device to the first base station. In addition, when measuring the to-be-measured neighboring cell, the terminal device may also report the location information of the terminal device to the first base station if the SSB of the to-be-measured neighboring cell always cannot be measured in a time segment. After receiving the location information of the terminal device, the first base station determines, based on the location information of the terminal device and location information of the first base station and the second base station, an SMTC window applicable to the to-be-measured neighboring cell, and then sends SMTC configuration information including a configuration parameter of the SMTC window to the terminal device, so that the terminal device can obtain the SMTC configuration information configured by the first base station.

Alternatively, when measuring the to-be-measured neighboring cell, the terminal device may also report at least one of the SMTC window configuration request information and the neighboring cell SSB detection failure information to the first base station if the SSB of the to-be-measured neighboring cell always cannot be measured in a time segment. After receiving the at least one of the SMTC window configuration request information and the neighboring cell SSB detection failure information, the first base station may send location request information to the terminal device, so that the terminal device reports the location information of the terminal device to the first base station. Then, the first base station determines, based on the location information of the terminal device and location information of the first base station and the second base station, an SMTC window applicable to the to-be-measured neighboring cell, and sends SMTC configuration information including a configuration parameter of the SMTC window to the terminal device.

The terminal device may send the first report information to the first base station by using RRC information. Certainly, the terminal device may alternatively send the first report information by using information in another form. This is not limited in this embodiment of this application.

Figure 13:
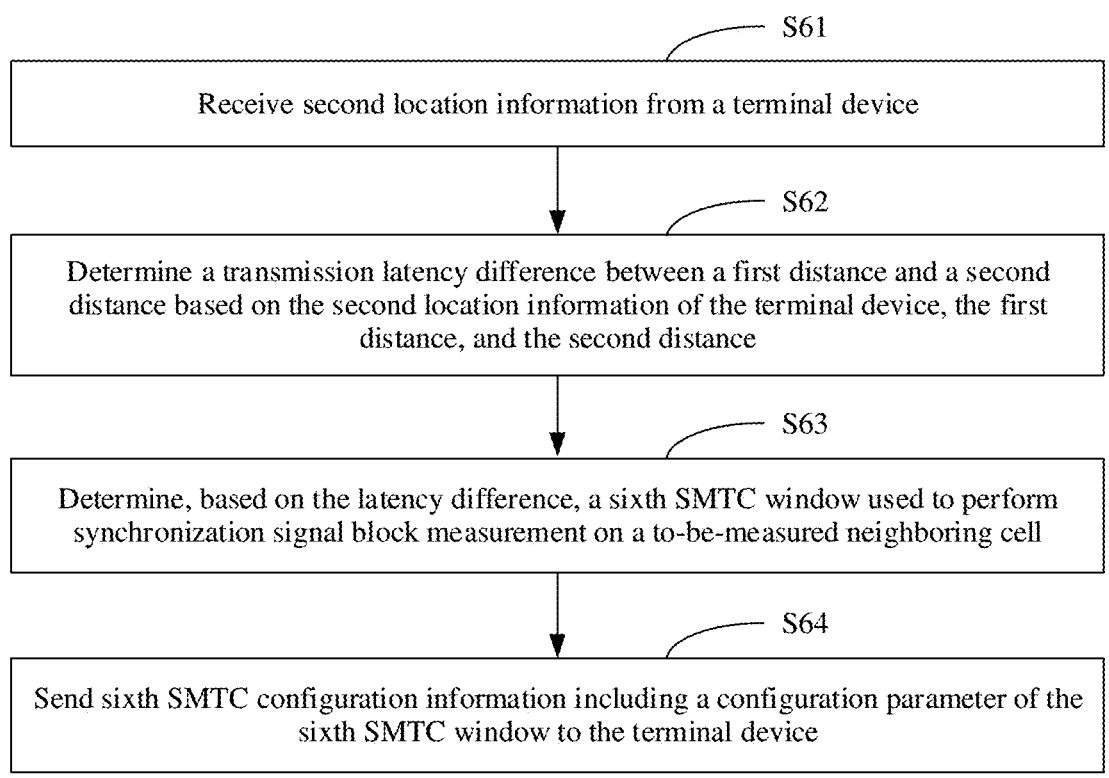
FIG. 13 is a schematic diagram of a working procedure of another measurement method using a synchronization signal block according to an embodiment of this application.

Correspondingly, another embodiment of this application further discloses a measurement method using a synchronization signal block. The method is applicable to a first base station, and the first base station is a base station of a serving cell in which a terminal device is located. Referring to a schematic diagram of a working procedure shown in FIG. 13, the method includes the following steps.

Step S61: Receive second location information from the terminal device, where the second location information is used to indicate a location of the terminal device.

Step S62: Determine a transmission latency difference between a first distance and a second distance based on the second location information of the terminal device, the first distance, and the second distance.

The first distance is a distance at which a signal of the first base station is transmitted to the terminal device, the second distance is a distance at which a signal of a second base station is transmitted to the terminal device, and the second base station is a base station corresponding to a to-be-measured neighboring cell.

Step S63: Determine, based on the latency difference, a sixth SMTC window used to perform synchronization signal block measurement on the to-be-measured neighboring cell.

Step S64: Send sixth SMTC configuration information including a configuration parameter of the sixth SMTC window to the terminal device.

In this case, after receiving the sixth SMTC configuration information, the terminal device can determine the sixth SMTC window, and measure the to-be-measured neighboring cell by using the sixth SMTC window.

In this embodiment of this application, the first base station can determine the location information of the terminal device based on the second location information sent by the terminal device, and then determine, based on the second location information of the terminal device, the first distance, and the second distance, the sixth SMTC window applicable to the to-be-measured neighboring cell. Therefore, the terminal device can measure the to-be-measured neighboring cell by using the sixth SMTC window, to prevent the terminal device from missing an SSB of the to-be-measured neighboring cell.

Further, in this embodiment of this application, the method further includes sending a third identifier to the terminal device, where the third identifier is used to indicate the to-be-measured neighboring cell corresponding to the sixth SMTC configuration information.

When the terminal device needs to measure a plurality of to-be-measured neighboring cells, the terminal device may determine, by using the third identifier, to-be-measured neighboring cells to which the sixth SMTC window is applicable, and measure the to-be-measured neighboring cells by using the sixth SMTC window.

Further, in this embodiment of this application, before the determining, based on the latency difference, a sixth SMTC window used to perform synchronization signal block measurement on the to-be-measured neighboring cell, the method further includes determining, based on the latency difference, that a seventh SMTC window is invalid for the to-be-measured neighboring cell, where the seventh SMTC window is a preconfigured SMTC window used to perform synchronization signal block measurement on the to-be-measured neighboring cell.

The first base station usually preconfigures the seventh SMTC window for the to-be-measured neighboring cell. However, when the latency difference is relatively large, the seventh SMTC window may be not applicable to the to-be-measured neighboring cell. In this case, the first base station may determine, based on the latency difference, whether the seventh SMTC window is invalid for the to-be-measured neighboring cell, and if the seventh SMTC window is invalid, determine, based on the latency difference, the sixth SMTC window used to perform synchronization signal block measurement on the to-be-measured neighboring cell.

This embodiment of this application discloses step S63, that is, determining, based on the latency difference, a sixth SMTC window used to perform synchronization signal block measurement on the to-be-measured neighboring cell. The first base station may determine the sixth SMTC window in a plurality of manners.

In a feasible manner, the sixth SMTC window is determined by when the to-be-measured neighboring cell includes at least one to-be-measured cell, determining, based on the latency difference corresponding to the to-be-measured neighboring cell, an offset and/or duration of a sixth SMTC window corresponding to the at least one to-be-measured cell.

In the foregoing step, the first base station separately configures one sixth SMTC window for each to-be-measured cell. When configuring the sixth SMTC window corresponding to each to-be-measured cell for the to-be-measured cell, the first base station determines a latency difference between a latency that is between the first base station and the terminal device and a latency that is between a second base station corresponding to the to-be-measured cell and the terminal device, and then determines an offset and/or duration of the sixth SMTC window based on the latency difference. In addition, a periodicity of the sixth SMTC window of each to-be-measured neighboring cell is the same as a periodicity of an SMTC window previously configured by the first base station for the to-be-measured neighboring cell.

That is, when the sixth SMTC window is determined in the foregoing manner, if the sixth SMTC window needs to be configured for n to-be-measured neighboring cells, the first base station configures n sixth SMTC windows.

In addition, when there are two or more to-be-measured neighboring cells, when transmitting SMTC configuration information including a configuration parameter of a sixth SMTC window to the terminal device, the first base station adds, to the SMTC configuration information, an identifier of a to-be-measured neighboring cell corresponding to the SMTC configuration information, so that the terminal device determines the to-be-measured neighboring cell corresponding to the received SMTC configuration information.

A method in which the first base station determines, based on the latency difference corresponding to the to-be-measured neighboring cell, the sixth SMTC window corresponding to each to-be-measured neighboring cell is the same as the method used in the foregoing embodiment, and details are not described herein.

In another feasible implementation, the first base station determines the sixth SMTC window by performing, when the to-be-measured neighboring cell includes more than two to-be-measured cells, determining, based on latency differences corresponding to the to-be-measured cells and duration of SSBs of the to-be-measured cells, third adjustment amounts of an offset of an SMTC window that are corresponding to the to-be-measured cells, and when an intersection set of the third adjustment amounts corresponding to the to-be-measured cells is not empty, determining, based on the intersection set of the third adjustment amounts corresponding to the to-be-measured cells, a same sixth SMTC window corresponding to the to-be-measured cells.

In the foregoing method, the first base station separately determines the third adjustment amounts of the offset of the SMTC window that are corresponding to the to-be-measured cells. After the offset of the SMTC window is adjusted based on a third adjustment amount corresponding to each to-be-measured cell, an obtained SMTC window is an SMTC window applicable to the to-be-measured cell.

After the third adjustment amounts respectively corresponding to the to-be-measured cells are obtained, when the intersection set of the third adjustment amounts corresponding to the to-be-measured cells is not empty, a value in the intersection set is used as an adjustment value of the offset, and an offset of the sixth SMTC window is determined based on the adjustment value. In addition, a periodicity and duration of the sixth SMTC window are respectively the same as a periodicity and duration of an SMTC window previously configured by the first base station for the to-be-measured neighboring cell.

Further, in the foregoing method, when the intersection set of the third adjustment amounts corresponding to the to-be-measured cells is empty, offsets and/or duration of fifth SMTC windows corresponding to the to-be-measured cells are respectively determined based on the third adjustment amounts corresponding to the to-be-measured cells.

That is, when the sixth SMTC window is determined in the foregoing manner, if the sixth SMTC window needs to be configured for n to-be-measured neighboring cells, and the intersection set of the third adjustment amounts of the offsets of the to-be-measured neighboring cells is not empty, the first base station needs to configure only one sixth SMTC window, and the sixth SMTC window is applicable to the n to-be-measured neighboring cells, thereby reducing a quantity of sixth SMTC windows configured by the first base station, and simplifying an operation of the first base station. Accordingly, a quantity of SMTC windows used when the terminal device measures the to-be-measured neighboring cells is also reduced, so that an operation of measuring the to-be-measured neighboring cells by the terminal device can be simplified.

In addition, when the intersection set of the third adjustment amounts is empty, the first base station separately configures corresponding sixth SMTC windows for the to-be-measured neighboring cells, that is, configures n sixth SMTC windows, to meet a requirement of each to-be-measured neighboring cell.

Further, when the first base station determines two or more sixth SMTC windows, when transmitting SMTC configuration information including a configuration parameter of a sixth SMTC window to the terminal device, the first base station adds, to the SMTC configuration information, an identifier of a to-be-measured neighboring cell corresponding to the SMTC configuration information, so that the terminal device determines the to-be-measured neighboring cell corresponding to the received SMTC configuration information.

A method in which the first base station determines the offset of the sixth SMTC window based on the intersection set of the third adjustment amounts is the same as the method used in the foregoing embodiment, and details are not described herein.

In another feasible implementation, the first base station determines the sixth SMTC window by, when the to-be-measured neighboring cell includes more than two to-be-measured cells, determining, based on latency differences corresponding to the to-be-measured cells and duration of SSBs of the to-be-measured cells, third adjustment amounts of an offset of an SMTC window that are corresponding to the to-be-measured cells, when an intersection set of the third adjustment amounts corresponding to the to-be-measured cells is empty, increasing duration of a sixth SMTC window, where the sixth SMTC window is a preconfigured SMTC window used to perform synchronization signal block measurement on the to-be-measured neighboring cell, determining, based on the sixth SMTC window whose duration is increased, fourth adjustment amounts of the offset of the SMTC window that are corresponding to the to-be-measured neighboring cells, and when an intersection set of the fourth adjustment amounts corresponding to the to-be-measured cells is not empty, determining, based on the intersection set of the fourth adjustment amounts corresponding to the to-be-measured cells, a same fifth SMTC window corresponding to the to-be-measured cells.

In the foregoing manner, when the intersection set of the third adjustment amounts corresponding to the to-be-measured cells is empty, the first base station first increases the duration of the sixth SMTC window. After the duration is increased, a time that is of the sixth SMTC window and in which the to-be-measured neighboring cell can be measured is increased. In this case, the fourth adjustment amounts of the offset of the SMTC window that are corresponding to the to-be-measured neighboring cells are determined based on the sixth SMTC window whose duration is increased. When the intersection set of the third adjustment amounts is not empty, the first base station needs to configure only one sixth SMTC window, and the sixth SMTC window is applicable to the n to-be-measured neighboring cells, thereby reducing a quantity of sixth SMTC windows configured by the first base station, and simplifying an operation of the first base station. Accordingly, a quantity of SMTC windows used when the terminal device measures the to-be-measured neighboring cells is also reduced, so that an operation of measuring the to-be-measured neighboring cells by the terminal device can be simplified.

In addition, when the intersection set of the fourth adjustment amounts is empty, the first base station separately configures corresponding sixth SMTC windows for the to-be-measured neighboring cells, that is, configures n sixth SMTC windows, to meet a requirement of each to-be-measured neighboring cell.

Further, when the first base station determines two or more sixth SMTC windows, when transmitting SMTC configuration information including a configuration parameter of a sixth SMTC window to the terminal device, the first base station adds, to the SMTC configuration information, an identifier of a to-be-measured neighboring cell corresponding to the SMTC configuration information, so that the terminal device determines the to-be-measured neighboring cell corresponding to the received SMTC configuration information.

A method in which the first base station determines the offset of the sixth SMTC window based on the intersection set of the fourth adjustment amounts is the same as the method used in the foregoing embodiment, and details are not described herein.

In another feasible implementation, the first base station determines the sixth SMTC window by, when the to-be-measured neighboring cell includes more than two to-be-measured cells, determining, based on latency differences corresponding to the to-be-measured cells and duration of SSBs of the to-be-measured cells, third adjustment amounts of an offset of an SMTC window that are corresponding to the to-be-measured cells, determining an intersection set of third adjustment amounts corresponding to at least one first to-be-measured cell, and determining, based on the intersection set of the third adjustment amounts corresponding to the at least one first to-be-measured cell, a same sixth SMTC window corresponding to the at least one first to-be-measured cell, where the intersection set of the third adjustment amounts corresponding to the at least one first to-be-measured cell is not empty, and separately determining, based on a latency difference corresponding to at least one second to-be-measured cell, an offset and/or duration of a sixth SMTC window corresponding to the at least one second to-be-measured cell, where an intersection set of third adjustment amounts corresponding to the at least one second to-be-measured cell is not empty, and the first to-be-measured cell and the second to-be-measured cell jointly form the to-be-measured neighboring cell.

In the foregoing manner, the to-be-measured neighboring cells are divided into two parts, an intersection set of third adjustment amounts of a first part of to-be-measured neighboring cells is not empty, and an intersection set of third adjustment amounts of a second part of to-be-measured neighboring cells is empty. In this case, based on the intersection set of the third adjustment amounts of the first part of to-be-measured neighboring cells, the first base station may determine, for the first part of to-be-measured neighboring cells, a sixth SMTC window applicable to the first part of to-be-measured neighboring cells, thereby reducing a quantity of sixth SMTC windows configured by the first base station. For each to-be-measured neighboring cell in the second part of to-be-measured neighboring cells, a sixth SMTC window applicable to the to-be-measured neighboring cell is separately configured, to meet a requirement of each to-be-measured neighboring cell in the second part of to-be-measured neighboring cells. In addition, a quantity of SMTC windows used when the terminal device measures the to-be-measured neighboring cells is also reduced, so that an operation of measuring the to-be-measured neighboring cells by the terminal device can be simplified.

Certainly, the first base station may alternatively determine the sixth SMTC window in another manner. When there are two or more to-be-measured neighboring cells, the first base station may separately determine one sixth SMTC window for each to-be-measured neighboring cell, or may configure a same sixth SMTC window for some to-be-measured neighboring cells. That is, one sixth SMTC window is applicable to a plurality of to-be-measured neighboring cells. This is not limited in this embodiment of this application.

Figure 14A:
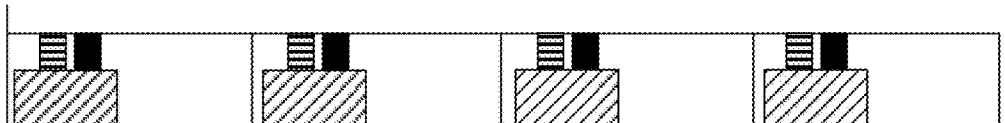
FIG. 14(a) to FIG. 14(f) are a schematic diagram of an application effect of another SMTC window according to an embodiment of this application.
Figure 14B:
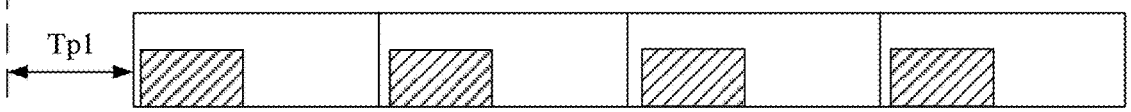
Figure 14C:
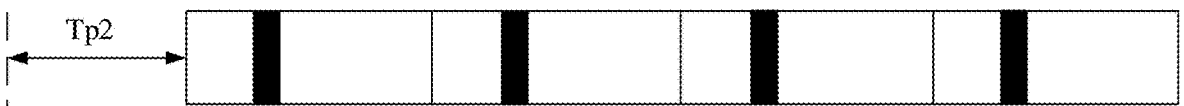
Figure 14D:
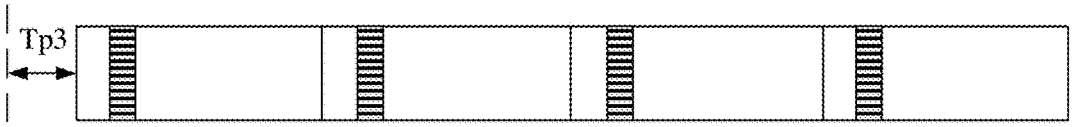
Figure 14E:
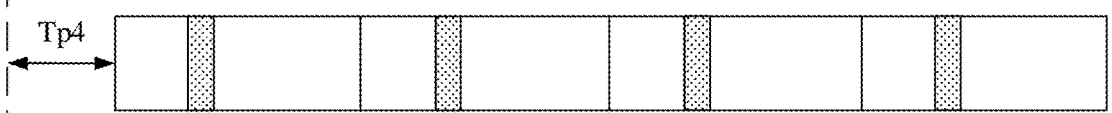
Figure 14F:
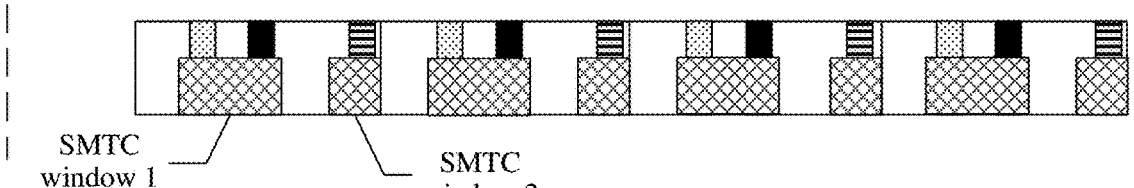

In this embodiment of this application, FIG. 14(a) to FIG. 14(f) are disclosed. In an application scenario corresponding to FIG. 14(a) to FIG. 14(f), there are three to-be-measured neighboring cells, a first base station is a gNB1, and second base stations corresponding to the three to-be-measured neighboring cells are respectively a gNB2, a gNB3, and a gNB4. FIG. 14(a) shows a downlink signal (that is, an unshaded rectangular box) periodically transmitted by the gNB1, where a rectangular box filled with slashes is an SMTC window configured by the gNB1. FIG. 14(b) shows a downlink signal of the gNB1 that arrives at a terminal device after a latency of a time Tp1. FIG. 14(c) shows a downlink signal sent by the gNB2, and the downlink signal includes an SSB (represented by a solid rectangular box in FIG. 14(c)) of the gNB2. FIG. 14(d) shows a downlink signal sent by the gNB3, and the downlink signal includes an SSB (represented by a rectangular box filled with horizontal lines in FIG. 14(d)) of the gNB3. FIG. 14(e) shows a downlink signal sent by the gNB3, and the downlink signal includes an SSB (represented by a rectangular box filled with dots in FIG. 14(e)) of the gNB3.

In this case, by using the solution in this embodiment of this application, the first base station may generate configuration parameters corresponding to two SMTC windows, and transmit the configuration parameters to the terminal device by using SMTC configuration information. Specifically, the first base station may generate a configuration parameter of an SMTC window 1 applicable to the gNB2 and the gNB4, and transmit SMTC 1 configuration information including the configuration parameter of the SMTC window 1 to the terminal device. Correspondingly, the SMTC 1 configuration information includes identifiers of the gNB2 and the gNB4 (the identifiers may be IDs or other parameters of to-be-measured neighboring cells corresponding to the gNB2 and the gNB4, or may be corresponding satellite IDs when base station functions of the gNB2 and the gNB4 are deployed on satellites). After receiving the SMTC 1 configuration information, the terminal device may determine the SMTC window 1 based on the configuration parameter of the SMTC window 1 included in the SMTC 1 configuration information, and determine, based on the identifiers of the gNB2 and the gNB4 included in the SMTC window 1, that the SMTC window 1 is applicable to the gNB2 and the gNB4. Therefore, the terminal device measures, based on the SMTC window 1, cells corresponding to the gNB2 and the gNB4.

In addition, the first base station may further generate a configuration parameter of an SMTC window 2 applicable to the gNB3, and transmit SMTC 2 configuration information including the configuration parameter of the SMTC window 2 to the terminal device. Correspondingly, the SMTC 2 configuration information includes an identifier of the gNB3 (the identifier may be an ID or another parameter of a to-be-measured neighboring cell corresponding to the gNB3, or may be a corresponding satellite ID when a base station function of the gNB3 is deployed on a satellite). After receiving the SMTC 2 configuration information, the terminal device may determine the SMTC window 2 based on the configuration parameter of the SMTC window 2 included in the SMTC 2 configuration information, and determine, based on the identifier of the gNB3 included in the SMTC window 2, that the SMTC window 2 is applicable to the gNB3. Therefore, the terminal device measures, based on the SMTC window 2, a cell corresponding to the gNB3.

To clarify operations of the terminal device and the first base station, the following discloses an example by using a schematic diagram of information exchange. The example is used to describe operations that can be performed by the terminal device and the first base station.

Figure 15:
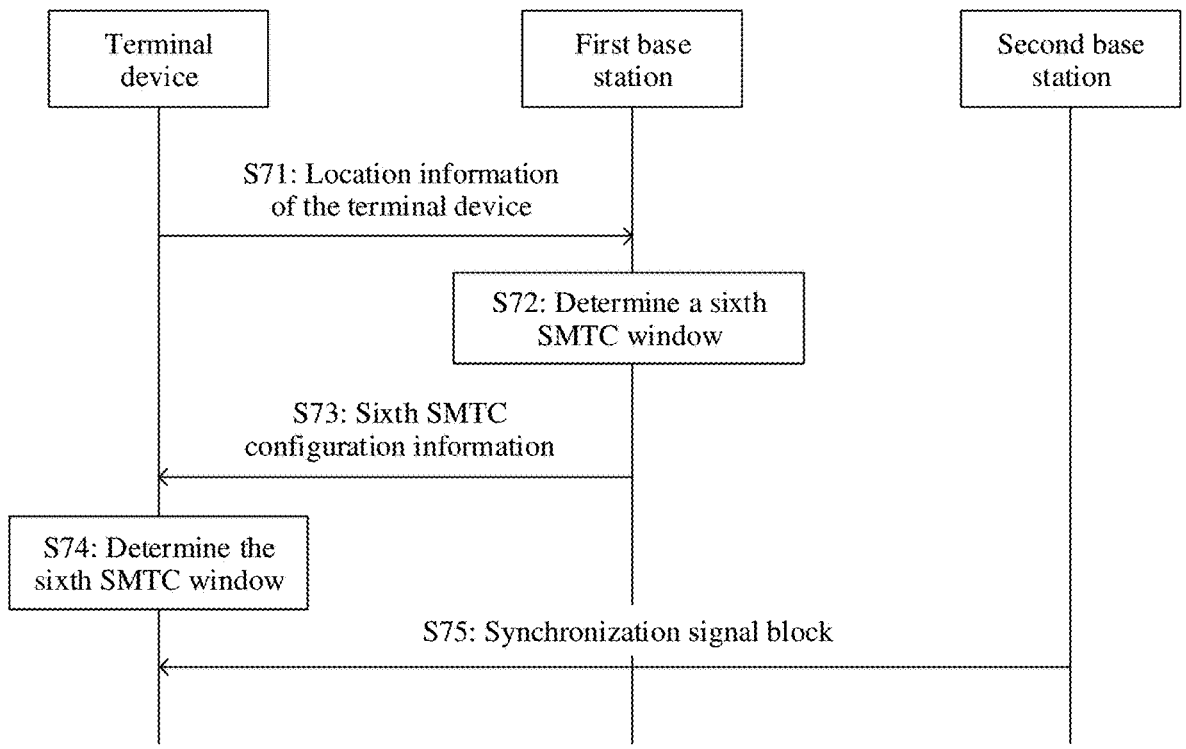
FIG. 15 is another schematic diagram of information exchange in a measurement method using a synchronization signal block according to an embodiment of this application.

Referring to a schematic diagram of information exchange shown in FIG. 15, in the example, an information exchange process between the terminal device and the first base station includes the following steps.

Step S71: The terminal device sends location information of the terminal device to the first base station.

Step S72: The first base station receives the location information from the terminal device, determines a transmission latency difference between a first distance and a second distance based on the location information of the terminal device, the first distance, and the second distance, and determines, based on the latency difference, a sixth SMTC window used to perform synchronization signal block measurement on the to-be-measured neighboring cell.

Step S73: The first base station sends sixth SMTC configuration information including a configuration parameter of the sixth SMTC window to the terminal device.

Step S74: The terminal device determines the sixth SMTC window based on the sixth SMTC configuration information.

Step S75: The terminal device measures the to-be-measured neighboring cell by using the sixth SMTC window.

According to the foregoing example, the terminal device can transmit the location information of the terminal device to the first base station. The first base station determines the SMTC window of the to-be-measured neighboring cell based on the location information of the terminal device, and transmits corresponding SMTC configuration information to the terminal device. The terminal device measures the to-be-measured neighboring cell based on the SMTC window indicated by the SMTC configuration information.

The following provides apparatus embodiments of the present invention, to execute the method embodiments of the present invention. For details that are not disclosed in the apparatus embodiments of the present invention, refer to the method embodiments of the present invention.

Correspondingly, another embodiment of this application further discloses a terminal device. The terminal device includes a processing module. The processing module is configured to determine a first adjustment parameter of a to-be-measured neighboring cell, determine, based on the first adjustment parameter, a first synchronization signal block-based measurement timing configuration SMTC window corresponding to the to-be-measured neighboring cell, and measure the to-be-measured neighboring cell based on the first SMTC window.

The first adjustment parameter of the to-be-measured neighboring cell includes a latency difference between signals of a first base station and a second base station that are transmitted to the terminal device, and/or time domain location information of an SSB of the to-be-measured neighboring cell.

The first base station is a base station of a serving cell.

The second base station is a base station corresponding to the to-be-measured neighboring cell.

Further, in embodiments of this application, the processing module is configured to determine location information of the second base station based on a first identifier of the to-be-measured neighboring cell, and determine, based on location information of the first base station and the second base station, the latency difference between signals of the first base station and the second base station that are transmitted to the terminal device. Correspondingly, the processing module can determine the latency difference, in the first adjustment parameter, between signals of the first base station and the second base station that are transmitted to the terminal device.

Further, the terminal device disclosed in embodiments of this application further includes a receiving module, where the receiving module is configured to receive the first identifier, and the first identifier is from the first base station.

In addition, the processing module is configured to determine a time domain location of the SSB of the to-be-measured neighboring cell by separately measuring a primary synchronization signal PSS and/or a secondary synchronization signal SSS of the to-be-measured neighboring cell at different time domain locations. Correspondingly, the processing module can determine the time domain location of the SSB of the to-be-measured neighboring cell in the first adjustment parameter.

In embodiments of this application, the terminal device may determine the first SMTC window in a plurality of manners. In one manner, the processing module is configured to determine a first adjustment amount based on the latency difference, where the first adjustment amount includes at least one first adjustment value, and determine an offset of the first SMTC window based on the first adjustment amount and a second SMTC window, where the second SMTC window is configured by the first base station.

That is, the processing module adjusts an offset of the second SMTC window by using the first adjustment amount, to determine the first SMTC window.

In another manner, the processing module is configured to determine a second adjustment amount based on the latency difference, where the second adjustment amount includes at least one second adjustment value, and determine duration of the first SMTC window based on the second adjustment amount and the second SMTC window, where the second SMTC window is configured by the first base station.

That is, the processing module adjusts duration of the second SMTC window by using the second adjustment amount, to determine the first SMTC window.

In another manner, a periodicity and duration of the first SMTC window are respectively determined based on a periodicity and duration of a second SMTC window, where the second SMTC window is configured by the first base station.

An offset of the first SMTC window is determined based on a time domain location of the SSB of the to-be-measured neighboring cell.

In this case, the offset of the first SMTC window is determined by using the time domain location of the SSB of the to-be-measured neighboring cell, the periodicity of the first SMTC window is usually the same as the periodicity of the second SMTC window, and the duration of the first SMTC window is usually the same as the duration of the second SMTC window.

Further, in the terminal device in embodiments of this application, the processing module is further configured to before determining the first adjustment parameter of the to-be-measured neighboring cell, determine, based on first indication information from the first base station, that the second SMTC window is invalid, where the second SMTC window is configured by the first base station, and determine the location information of the second base station based on the first identifier of the to-be-measured neighboring cell, and determine, based on the location information of the second base station, that a distance difference between a first distance and a second distance is greater than a first threshold.

The first base station is the base station of the serving cell, the second base station is the base station corresponding to the to-be-measured neighboring cell, the first distance is a distance at which a signal of the first base station is transmitted to the terminal device, and the second distance is a distance at which a signal of the second base station is transmitted to the terminal device.

According to the solutions in embodiments of this application, the terminal device determines, by using the first adjustment parameter of the to-be-measured neighboring cell, the first SMTC window used to measure the to-be-measured neighboring cell, and the terminal device can measure the SSB of the to-be-measured neighboring cell by using the first SMTC window, to implement measurement of the to-be-measured neighboring cell.

Figure 16:
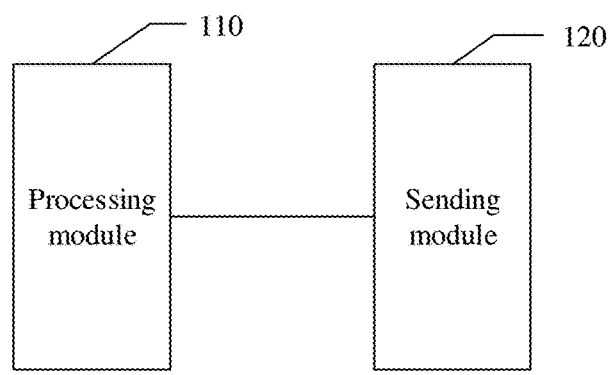
FIG. 16 is a schematic diagram of a structure of a base station according to an embodiment of this application.

Correspondingly, another embodiment of this application discloses a base station. The base station is a first base station of a serving cell in which a terminal device is located. Refer to a schematic diagram of a structure shown in FIG. 16. The base station includes a processing module 11o, configured to determine second indication information, where the second indication information is used to indicate that a fourth SMTC window is invalid for measuring a to-be-measured neighboring cell, and a sending module 120, configured to send the second indication information to the terminal device.

Further, in the base station disclosed in embodiments of this application, the processing module is further configured to determine a first distance and a second distance based on location information of the terminal device, the first base station, and a second base station, where the second base station is a base station corresponding to the to-be-measured neighboring cell, the first distance is a distance at which a signal of the first base station is transmitted to the terminal device, and the second distance is a distance at which a signal of the second base station is transmitted to the terminal device, and determine the second indication information when a difference between the first distance and the second distance is greater than a second threshold.

After receiving the second indication information, the terminal device may determine that the fourth SMTC window configured by the first base station is invalid for the to-be-measured neighboring cell, so that the terminal device does not measure the to-be-measured neighboring cell by using the fourth SMTC window, but determines, based on a first adjustment parameter, a first SMTC window applicable to the to-be-measured neighboring cell, and measures the to-be-measured neighboring cell by using the first SMTC window.

Correspondingly, another embodiment of this application discloses a base station. The base station is a first base station of a serving cell in which a terminal device is located, and includes a processing module, configured to determine a second identifier of a to-be-measured neighboring cell, where the to-be-measured neighboring cell is a cell to be measured by the terminal device by using a synchronization signal block, and a sending module, configured to send the second identifier to the terminal device.

After receiving the second identifier of the to-be-measured neighboring cell, the terminal device may determine location information of a second base station by querying a correspondence between the second identifier of the to-be-measured neighboring cell and the location information of the second base station, and then determine, based on location information of the terminal device and location information of the first base station and the location information of the second base station, a latency difference between signals of the first base station and the second base station that are transmitted to the terminal device. When the terminal device determines that the latency difference is relatively large, the terminal device determines an SMTC window corresponding to the to-be-measured neighboring cell, and measures the to-be-measured neighboring cell by using the SMTC window determined by the terminal device.

Figure 17:
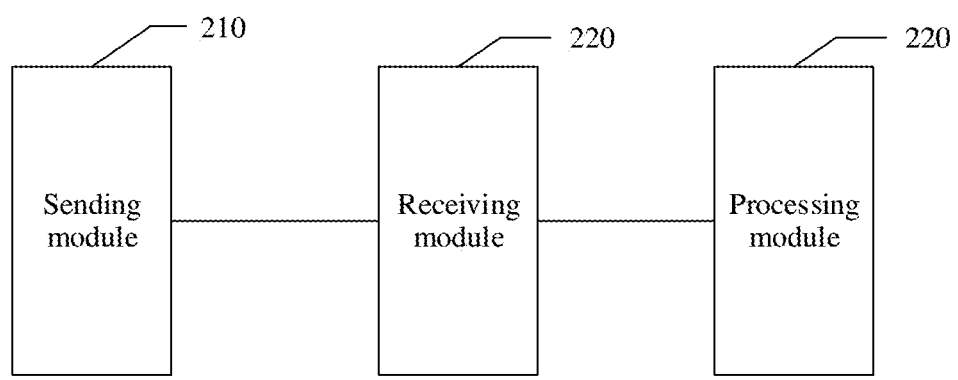
FIG. 17 is a schematic diagram of a structure of a terminal device according to an embodiment of this application.

Correspondingly, another embodiment of this application discloses a terminal device. Refer to a schematic diagram of a structure shown in FIG. 17. The terminal device includes a sending module 210, configured to send first location information to a first base station, where the first location information is used to indicate a location of the terminal device, and the first base station is a base station of a serving cell, a receiving module 220, configured to receive fifth SMTC configuration information, where the fifth SMTC configuration information includes a configuration parameter that is of a fifth SMTC window and that is determined by the first base station based on the first location information, and the fifth SMTC window is used to measure a to-be-measured neighboring cell, and a processing module 230, configured to measure the to-be-measured neighboring cell by using the fifth SMTC window.

In embodiments of this application, the terminal device may send, to the first base station, the first location information used to indicate the location of the terminal device. In this case, the first base station determines, based on the location information of the terminal device, a latency difference between the first base station and the terminal device and a latency difference between a second base station and the terminal device, and configures, for the terminal device by using the latency differences, the fifth SMTC window used to measure the to-be-measured neighboring cell.

Figure 18:
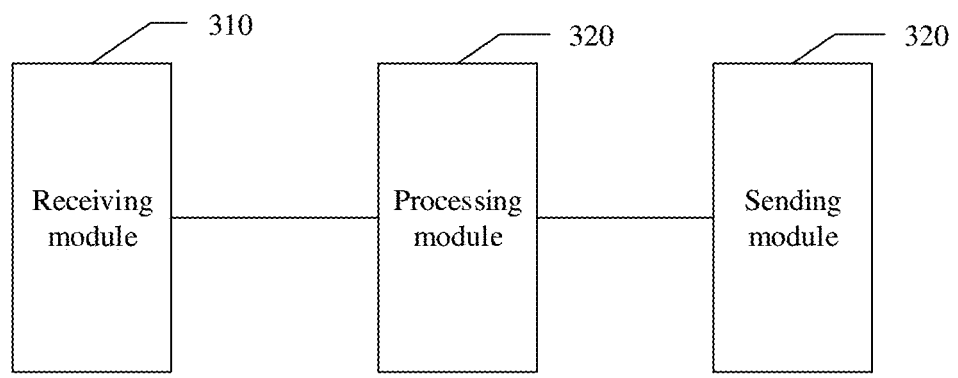
FIG. 18 is a schematic diagram of a structure of another base station according to an embodiment of this application.

Correspondingly, an embodiment of this application discloses a base station. The base station is a first base station of a serving cell in which a terminal device is located. Refer to a schematic diagram of a structure shown in FIG. 18. The base station includes a receiving module 310, configured to receive second location information from the terminal device, where the second location information is used to indicate a location of the terminal device, a processing module 320, configured to determine a transmission latency difference between a first distance and a second distance based on the second location information of the terminal device, the first distance, and the second distance, where the first distance is a distance at which a signal of the first base station is transmitted to the terminal device, the second distance is a distance at which a signal of a second base station is transmitted to the terminal device, and the second base station is a base station corresponding to a to-be-measured neighboring cell, where the processing module 320 is further configured to determine, based on the latency difference, a sixth SMTC window used to perform synchronization signal block measurement on the to-be-measured neighboring cell, and a sending module 330, configured to send sixth SMTC configuration information including a configuration parameter of the sixth SMTC window to the terminal device.

Further, the sending module 340 is further configured to send a third identifier to the terminal device, where the third identifier is used to indicate the to-be-measured neighboring cell corresponding to the sixth SMTC configuration information.

In embodiments of this application, the first base station can determine location information of the terminal device based on the second location information sent by the terminal device, and then determine, based on the second location information of the terminal device, the first distance, and the second distance, the sixth SMTC window applicable to the to-be-measured neighboring cell, so that the terminal device can measure the to-be-measured neighboring cell by using the sixth SMTC window, thereby preventing the terminal device from missing an SSB of the to-be-measured neighboring cell.

During specific implementation, an embodiment of this application further provides a computer-readable storage medium. The computer-readable storage medium stores instructions. When the instructions are run on a computer, the computer is enabled to implement all or some of the steps in the embodiments corresponding to FIG. 3 and FIG. 4, or all or some of the steps in the embodiments corresponding to FIG. 8 and FIG. 9, or all or some of the steps in the embodiment corresponding to FIG. 12, or all or some of the steps in the embodiment corresponding to FIG. 13. The computer-readable storage medium is disposed in any device. The any device may be a random access memory (RAM), or the memory may include a non-volatile memory, for example, a read-only memory (read-only memory, ROM), a flash memory, a hard disk drive (hard disk drive, HDD), or a solid-state drive (SSD), or the memory may include a combination of the foregoing types of memories, or the like.

Correspondingly, an embodiment of this application further discloses a computer program product including instructions. The computer program product is configured to store computer instructions. When the computer instructions are run on a computer, the computer is enabled to implement all or some of the steps in the embodiments corresponding to FIG. 3 and FIG. 4, or all or some of the steps in the embodiments corresponding to FIG. 8 and FIG. 9, or all or some of the steps in the embodiment corresponding to FIG. 12, or all or some of the steps in the embodiment corresponding to FIG. 13

Correspondingly, an embodiment of this application further discloses a measurement apparatus using a synchronization signal block. The measurement apparatus using a synchronization signal block is, for example, the terminal device or the base station in the foregoing embodiments of this application. The measurement apparatus using a synchronization signal block includes a processor. Optionally, the measurement apparatus using a synchronization signal block may further include a memory, configured to store computer instructions. The processor and the memory are coupled to each other, and are configured to implement the methods described in the foregoing implementations of this application. Alternatively, the measurement apparatus using a synchronization signal block may not include a memory, and the memory may be located outside the measurement apparatus using a synchronization signal block. Optionally, the measurement apparatus using a synchronization signal block may further include a communications interface, configured to communicate with another apparatus or device. The processor, the memory, and the communications interface are coupled to each other, and are configured to implement the methods described in the foregoing possible implementations of this application. For example, the measurement apparatus using a synchronization signal block is a terminal device, or is a chip or another component disposed in the terminal device. Alternatively, for example, the measurement apparatus using a synchronization signal block is a base station, or is a chip or another component disposed in the base station.

If the measurement apparatus using a synchronization signal block is a terminal device, the communications interface is implemented by a transceiver (or a transmitter and a receiver) or the like in the terminal device. For example, the transceiver is implemented by an antenna, a feeder, or a codec in the terminal device. Alternatively, if the measurement apparatus using a synchronization signal block is a chip disposed in the terminal device, the communications interface is an input/output interface or the like in the chip, for example, an input/output pin. The communications interface is connected to a radio frequency transceiver component in the terminal device, to implement information receiving and sending by using the radio frequency transceiver component.

Alternatively, if the measurement apparatus using a synchronization signal block is a base station, the communications interface is implemented by a transceiver (or a transmitter and a receiver) or the like in the base station. For example, the transceiver is implemented by an antenna, a feeder, or a codec in the base station. Alternatively, if the measurement apparatus using a synchronization signal block is a chip disposed in the base station, the communications interface is an input/output interface or the like in the chip, for example, an input/output pin. The communications interface is connected to a radio frequency transceiver component in the base station, to implement information receiving and sending by using the radio frequency transceiver component.

Correspondingly, an embodiment of this application further provides a communications system. The communications system includes a terminal device and a base station. The terminal device can perform all or some of the steps in the measurement method using a synchronization signal block disclosed in the foregoing embodiments corresponding to the terminal device in this application. The base station includes a base station of a serving cell, that is, a first base station, and a base station including a to-be-measured neighboring cell, that is, a second base station. The first base station can perform all or some of the steps in the measurement method using a synchronization signal block disclosed in the foregoing embodiments corresponding to the first base station in this application.

A person skilled in the art may further understand that various illustrative logical blocks and steps that are listed in embodiments of this application may be implemented by using electronic hardware, computer software, or a combination thereof. Whether the functions are implemented by hardware or software depends on a particular application and a design requirement of the entire system. A person skilled in the art may use various methods to implement the described functions for each particular application, but it should not be considered that the implementation goes beyond the scope of embodiments of this application.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk drive, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be disposed in an ASIC, and the ASIC may be disposed in UE. Optionally, the processor and the storage medium may be disposed in different components of the UE.

It should be understood that sequence numbers of the foregoing processes do not mean an execution sequence in various embodiments of this application. The execution sequence of the processes should be determined according to functions and internal logic of the processes, and should not be construed as any limitation on the implementation processes of embodiments of this application.

All or some of embodiments may be implemented by using software, hardware, firmware, or any combination thereof. When the software is used for implementation, all or some of embodiments may be implemented in a form of a computer program product. The computer program product includes one or more computer instructions. When the computer program instructions are loaded and executed on the computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The parts in this specification are all described in a progressive manner. Same or similar parts in embodiments may be mutually referenced, and each embodiment focuses on a difference from other embodiments. Especially, apparatus and system embodiments are basically similar to a method embodiment, and therefore are described briefly, for related parts, refer to partial descriptions in the method embodiment.

Although some embodiments of this application have been described, a person skilled in the art can make changes and modifications to these embodiments once the person skilled in the art learns of the basic inventive concept. Therefore, the following claims are intended to be construed as to cover the preferred embodiments and all changes and modifications falling within the scope of this application.

A person skilled in the art may clearly understand that, the technologies in embodiments of the present invention may be implemented by software in addition to a necessary general hardware platform. Based on such an understanding, the technical solutions of the present invention essentially or the part contributing to the prior art may be implemented in a form of a software product. The computer software product is stored in a storage medium, such as a ROM/RAM, a hard disk, or an optical disc, and includes several instructions for instructing a computer device (which may be a personal computer, a server, or a network device) to perform the methods described in embodiments or some parts of embodiments of the present invention.

Same or similar parts in embodiments of this specification may be mutually referenced. Particularly, the embodiments of the terminal device and the base station in this application are basically similar to the method embodiments, and therefore are described relatively briefly. For related parts, refer to the descriptions in the method embodiments.

The foregoing descriptions are implementations of the present invention, but are not intended to limit the protection scope of the present invention.

What is claimed is:

1. A communication method, comprising:
determining, based on location information of a first base station that is a base station of a serving cell and a second base station that is a base station corresponding to a to-be-measured neighboring cell, a latency difference between signals of the first base station and the second base station that are transmitted to a terminal device;
determining, by the terminal device, a first adjustment parameter of the to-be-measured neighboring cell according to at least the latency difference;
determining, based on the first adjustment parameter, a first synchronization signal block-based measurement timing configuration (SMTC) window corresponding to the to-be-measured neighboring cell; and
measuring the to-be-measured neighboring cell based on the first SMTC window.

2. The method according to claim 1, wherein the first adjustment parameter of the to-be-measured neighboring cell is further determined according to time domain location information of a synchronization signal and physical broadcast channel (PBCH) block (SSB) of the to-be-measured neighboring cell.

3. The method according to claim 2, wherein determining the location information of the second base station comprises determining location information of the second base station based on a first identifier of the to-be-measured neighboring cell.

4. The method according to claim 3, wherein the first identifier of the to-be-measured neighboring cell is obtained from the first base station.

5. The method according to claim 2, further comprising:
determining a time domain location of the SSB of the to-be-measured neighboring cell by separately measuring at least one of a primary synchronization signal (PSS) or a secondary synchronization signal (SSS) of the to-be-measured neighboring cell at different time domain locations.

6. The method according to claim 2, further comprising:
determining a first adjustment amount based on the latency difference, wherein the first adjustment amount comprises at least one first adjustment value; and
determining an offset of the first SMTC window based on the first adjustment amount and a second SMTC window, wherein the second SMTC window is configured by the first base station.

7. The method according to claim 6, wherein a first adjustment value of the at least one first adjustment value indicates at least one of one adjustable value of the offset, or one adjustable range of the offset.

8. The method according to claim 2, further comprising:
determining a second adjustment amount based on the latency difference, wherein the second adjustment amount comprises at least one second adjustment value; and
determining a duration of the first SMTC window based on the second adjustment amount and a second SMTC window, wherein the second SMTC window is configured by the first base station.

9. The method according to claim 8, wherein a second adjustment value of the at least one second adjustment value indicates at least one of one adjustable value of the duration, or one adjustable range of the duration.

10. The method according to claim 2, further comprising:
respectively determining a periodicity and duration of the first SMTC window based on a periodicity and duration of a second SMTC window, wherein the second SMTC window is configured by the first base station; and
determining an offset of the first SMTC window based on a time domain location of the SSB of the to-be-measured neighboring cell.

11. The method according to claim 2, further comprising performing, before the determining the first adjustment parameter of the to-be-measured neighboring cell, at least one of:
determining, based on first indication information from the first base station, that a second SMTC window is invalid, wherein the second SMTC window is configured by the first base station; or
determining the location information of the second base station based on a first identifier of the to-be-measured neighboring cell, and determining, based on the location information of the second base station, that a distance difference between a first distance and a second distance is greater than a first threshold, wherein the first base station is the base station of the serving cell, wherein the second base station is the base station corresponding to the to-be-measured neighboring cell, wherein the first distance is a distance over which a signal of the first base station is transmitted to the terminal device, and wherein the second distance is a distance over which a signal of the second base station is transmitted to the terminal device.

12. The method according to claim 1, further comprising:
determining a second adjustment parameter of the to-be-measured neighboring cell; and
determining, based on the second adjustment parameter, a third SMTC window corresponding to the to-be-measured neighboring cell, and measuring the to-be-measured neighboring cell by using the third SMTC window.

13. An apparatus, comprising:
one or more processors; and
one or more non-transitory memories coupled to the one or more processors and storing programming instructions for execution by the one or more processors the programming instructions including instructions for:
determining, based on location information of a first base station that is a base station of a serving cell and a second base station that is a base station corresponding to a to-be-measured neighboring cell, a latency difference between signals of the first base station and the second base station that are transmitted to the apparatus;
determining a first adjustment parameter of a to-be-measured neighboring cell according to the latency difference;
determining, based on the first adjustment parameter, a first synchronization signal block-based measurement timing configuration (SMTC) window corresponding to the to-be-measured neighboring cell; and
measuring the to-be-measured neighboring cell based on the first SMTC window.

14. The apparatus according to claim 13, wherein the first adjustment parameter of the to-be-measured neighboring cell is further determined according to time domain location information of a synchronization signal and physical broadcast channel (PBCH) block (SSB) of the to-be-measured neighboring cell.

15. The apparatus according to claim 14, wherein the instructions for determining location information of the second base station include instructions for:
determining the location information of the second base station based on a first identifier of the to-be-measured neighboring cell; and
determining, based on the location information of the first base station and the second base station, the latency difference between signals of the first base station and the second base station that are transmitted to the apparatus.

16. The apparatus according to claim 15, wherein the first identifier of the to-be-measured neighboring cell is obtained from the first base station.

17. The apparatus according to claim 14, wherein the programming instructions further include instructions for:
determining a time domain location of the SSB of the to-be-measured neighboring cell by separately measuring at least one of a primary synchronization signal (PSS) or a secondary synchronization signal (SSS) of the to-be-measured neighboring cell at different time domain locations.

18. The apparatus according to claim 14, wherein the programming instructions further include instructions for:
determining a first adjustment amount based on the latency difference, wherein the first adjustment amount comprises at least one first adjustment value; and determining an offset of the first SMTC window based on the first adjustment amount and a second SMTC window, wherein the second SMTC window is configured by the first base station.

* * * * *